US012663291B2

(12) United States Patent
Mizoguchi et al.

(10) Patent No.: US 12,663,291 B2
(45) Date of Patent: Jun. 23, 2026

(54) VEHICLE TRAVEL CONTROL ASSISTANCE SYSTEM HAVING MAP UPDATE FUNCTION, MAP UPDATE SERVER APPARATUS, AND ASSISTANCE SERVER APPARATUS

(71) Applicant: SUBARU CORPORATION, Tokyo (JP)

(72) Inventors: Masato Mizoguchi, Tokyo (JP); Hajime Oyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 239 days.

(21) Appl. No.: 18/250,297

(22) PCT Filed: Nov. 4, 2021

(86) PCT No.: PCT/JP2021/040677
§ 371 (c)(1),
(2) Date: Apr. 24, 2023

(87) PCT Pub. No.: WO2023/079659
PCT Pub. Date: May 11, 2023

(65) Prior Publication Data
US 2024/0377223 A1 Nov. 14, 2024

(51) Int. Cl.
*G01C 21/00* (2006.01)
*G06F 16/29* (2019.01)
*G09B 29/00* (2006.01)

(52) U.S. Cl.
CPC ..... *G01C 21/3848* (2020.08); *G01C 21/3896* (2020.08); *G06F 16/29* (2019.01); *G09B 29/003* (2013.01); *G01C 21/3889* (2020.08)

(58) Field of Classification Search
None
See application file for complete search history.

(56) References Cited

U.S. PATENT DOCUMENTS 11,340,080 B2 * 5/2022 Averilla ............. G01C 21/3673
2007/0195094 A1 8/2007 Adachi
(Continued)

FOREIGN PATENT DOCUMENTS

EP 3832422 A 6/2021
JP 2015-125359 A 7/2015
(Continued)

OTHER PUBLICATIONS

Office Action dated Aug. 27, 2024, from corresponding Japan Application No. 2023-557521, 4 pages.

*Primary Examiner* — Ramon A. Mercado
*Assistant Examiner* — David Ruben Pedersen
(74) *Attorney, Agent, or Firm* — Rimon P.C.

(57) ABSTRACT

A travel control assistance system for a vehicle includes assistance server apparatuses, and a map update server apparatus. The assistance server apparatuses generate data that assists in a travel control of the automobile, based on respective pieces of high-precision map data and transmit the data to the automobile. The map update server apparatus updates the high-precision map data held in the assistance server apparatuses. The high-precision map data held in the assistance server apparatuses include narrow-area high-precision map data and wide-area high-precision map data regarding a wide area including an area for the narrow-area high-precision map data. The narrow-area high-precision map data is held in the low-order assistance server apparatus. The wide-area high-precision map data is held in the high-order assistance server apparatus. The map update server apparatus updates the narrow-area high-precision map data and the wide-area high-precision map data based on common data.

10 Claims, 13 Drawing Sheets

(56)　　　　　　References Cited

U.S. PATENT DOCUMENTS

| | | | | |
|---|---|---|---|---|
| 2010/0274472 A1* | 10/2010 | Sakai | ................. | G01C 21/3859 |
| | | | | 701/532 |
| 2018/0151066 A1* | 5/2018 | Oba | ..................... | G05D 1/0285 |
| 2019/0084563 A1* | 3/2019 | Sogabe | ................. | B60W 40/04 |
| 2020/0004269 A1* | 1/2020 | Oba | .................... | B60W 30/165 |
| 2020/0191601 A1 | 6/2020 | Jiang et al. | | |
| 2021/0024084 A1* | 1/2021 | Kim | ........................ | H04W 4/40 |
| 2021/0333125 A1 | 10/2021 | Igarashi | | |
| 2021/0348943 A1 | 11/2021 | Hosoi et al. | | |
| 2022/0026212 A1* | 1/2022 | Toutov | ................. | G01C 21/005 |

FOREIGN PATENT DOCUMENTS

| | | | |
|---|---|---|---|
| JP | 2020-095250 | A | 6/2020 |
| JP | 2021-152853 | A | 9/2021 |
| JP | 2021-173902 | A | 11/2021 |
| WO | 2005-088584 | A1 | 9/2005 |
| WO | 2016/067850 | A1 | 5/2016 |
| WO | 2020-188671 | A1 | 9/2020 |

* cited by examiner

[ FIG. 1 ]
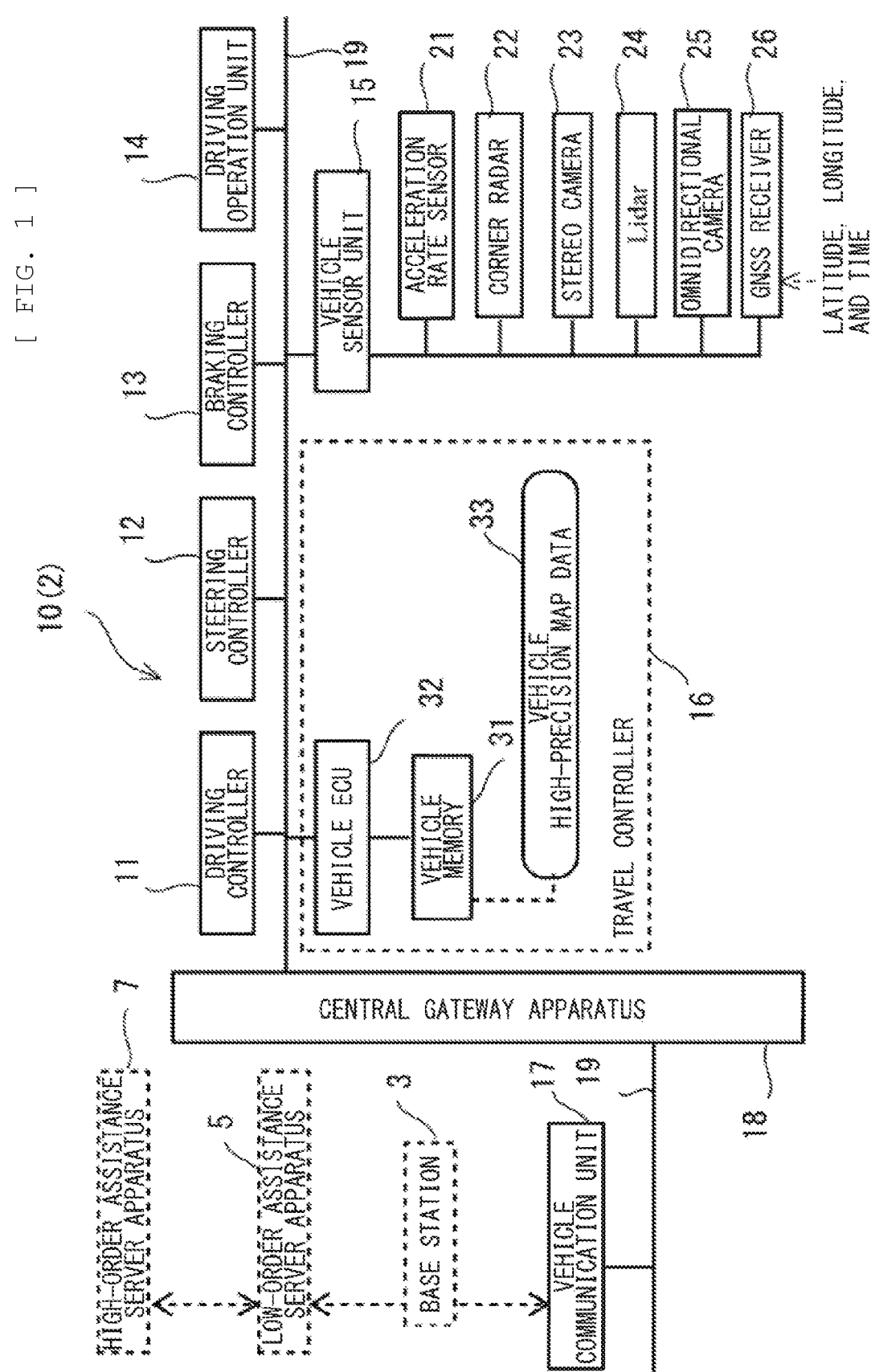

[ FIG. 2 ]
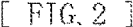
110
GNSS SATELLITES
LATITUDE, LONGITUDE, AND TIME
MAP UPDATE SERVER APPARATUS          8
6                                    1
7
HIGH-ORDER ASSISTANCE SERVER APPARATUS
LOW-ORDER ASSISTANCE SERVER APPARATUS          5
5          LOW-ORDER ASSISTANCE SERVER APPARATUS
4                                    4
3          3          3
2    10          DIRECTION OF MOVEMENT (DIRECTION OF TRAVEL)          10    2
NARROW AREA          NARROW AREA
WIDE AREA

[ FIG. 3 ]
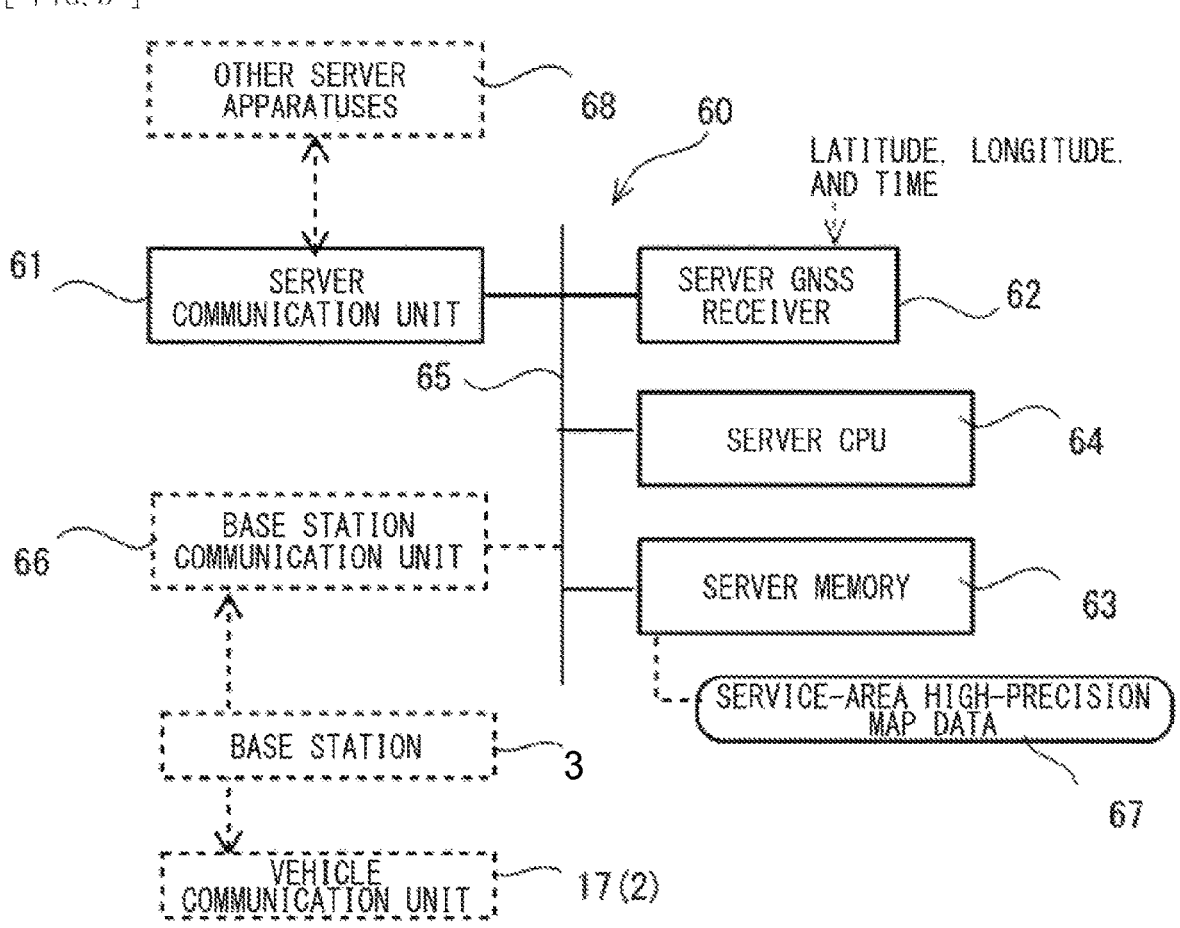
[ FIG. 4 ]
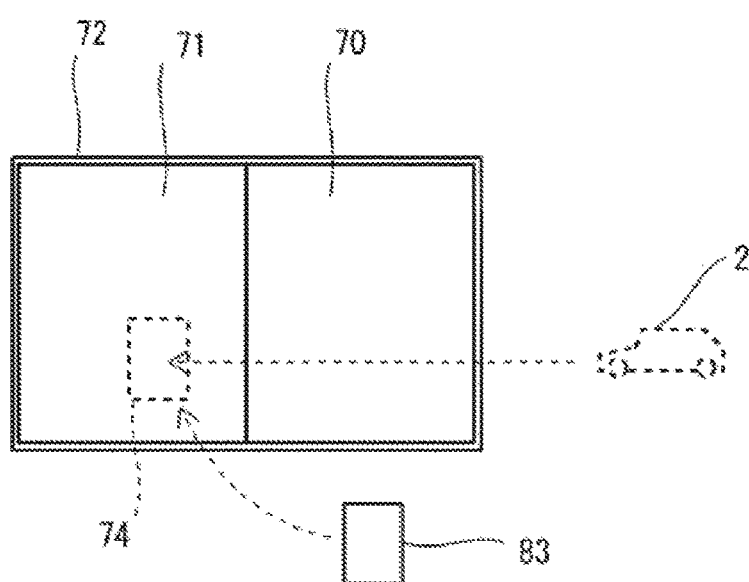

[ FIG. 5 ]
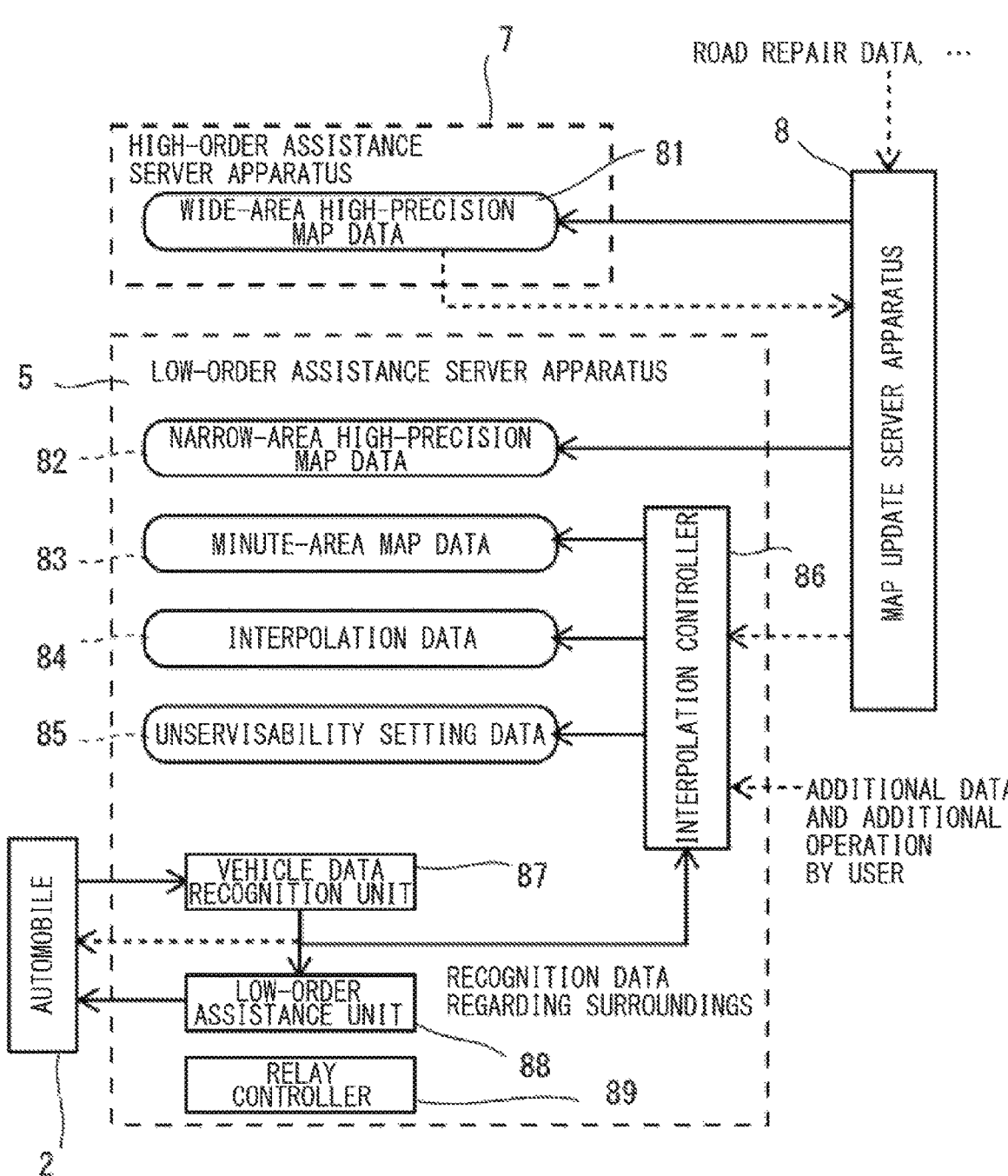

[ FIG. 6 ]
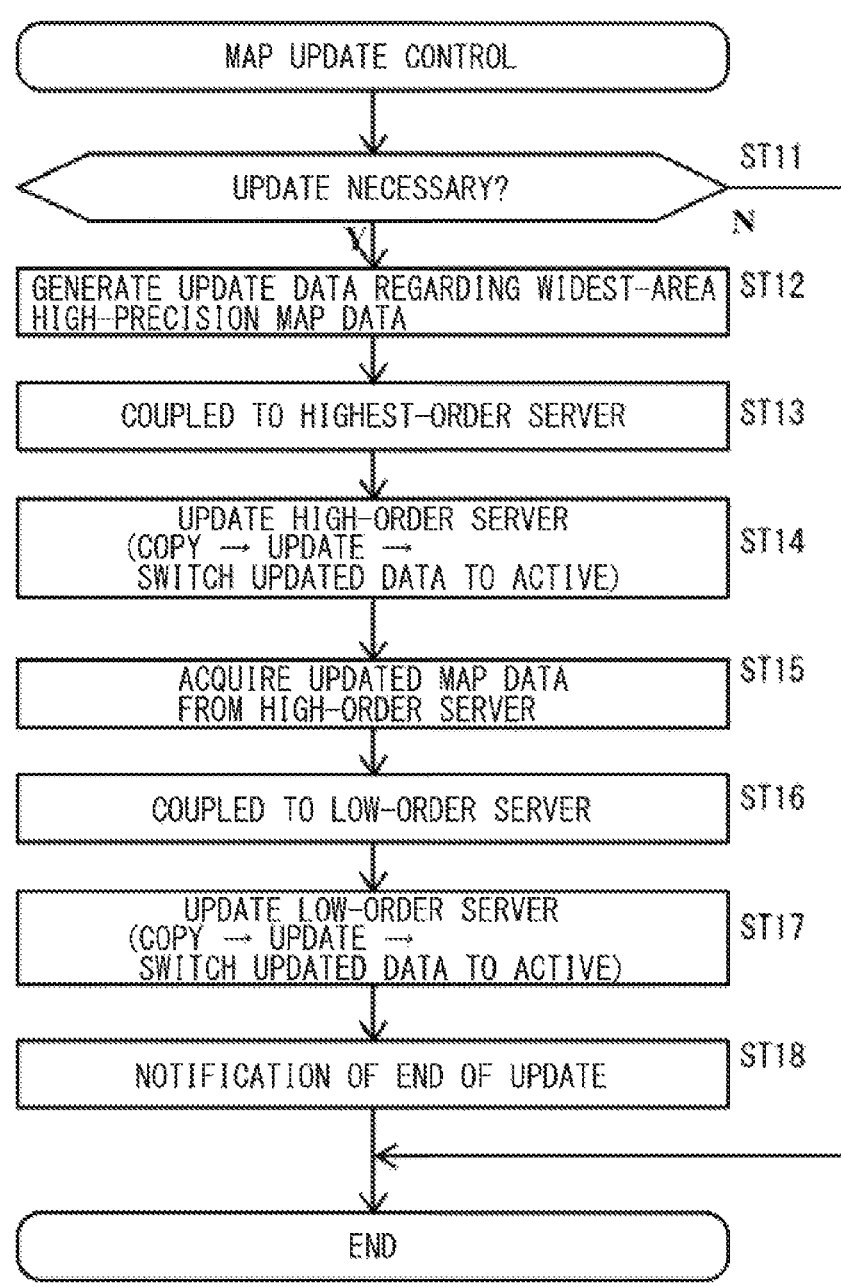

[ FIG. 7 ]
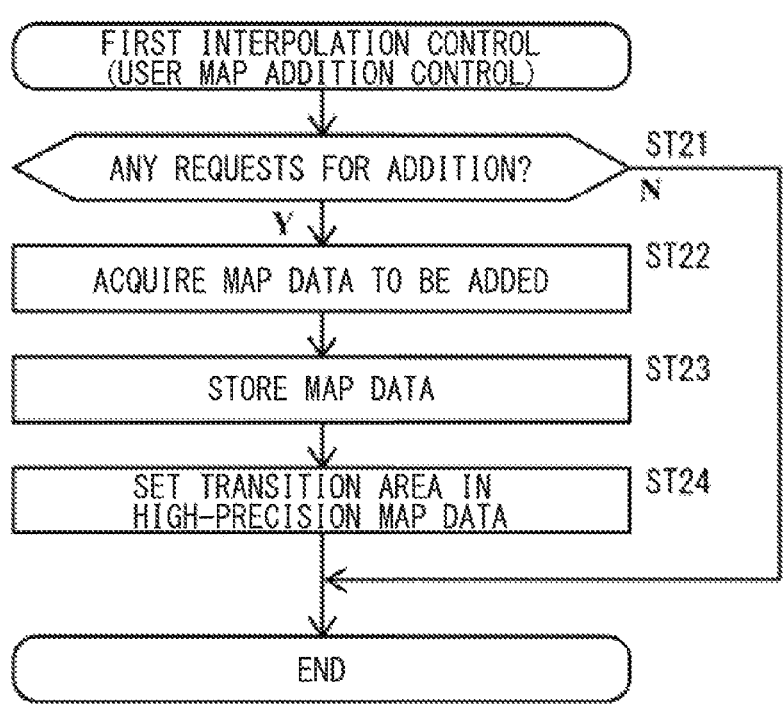

[ FIG. 8 ]

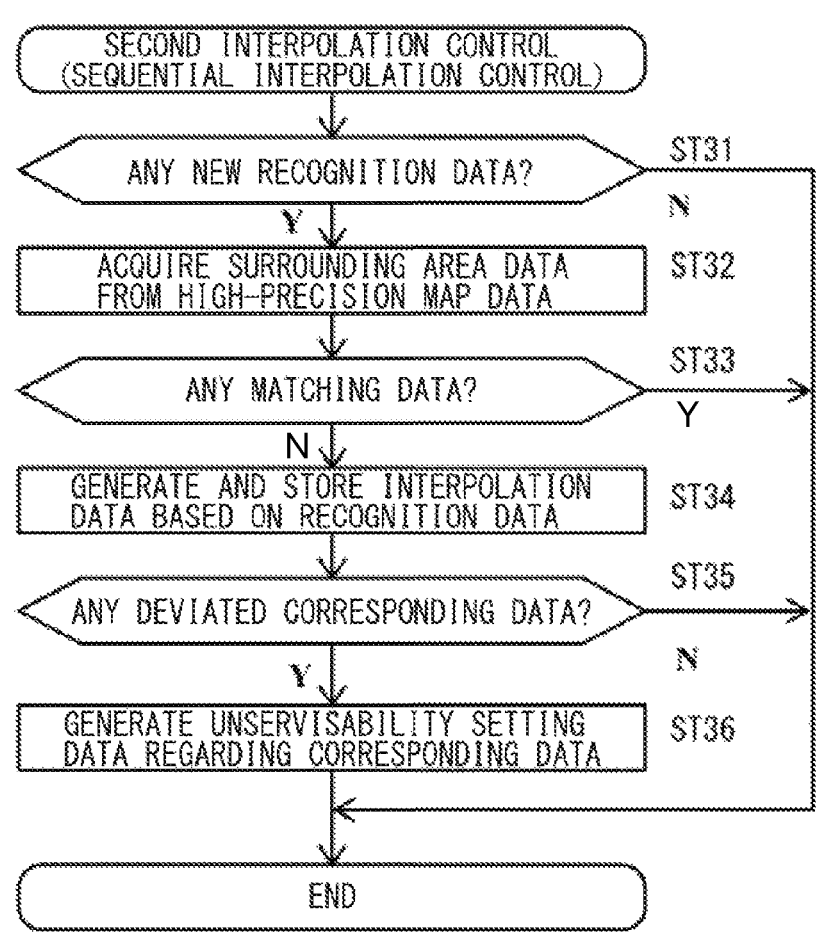

SECOND INTERPOLATION CONTROL
(SEQUENTIAL INTERPOLATION CONTROL)

ANY NEW RECOGNITION DATA?          ST31

ACQUIRE SURROUNDING AREA DATA      ST32
FROM HIGH-PRECISION MAP DATA

ANY MATCHING DATA?                 ST33

GENERATE AND STORE INTERPOLATION   ST34
DATA BASED ON RECOGNITION DATA

ANY DEVIATED CORRESPONDING DATA?   ST35

GENERATE UNSERVISABILITY SETTING   ST36
DATA REGARDING CORRESPONDING DATA

END

[ FIG. 9 ]

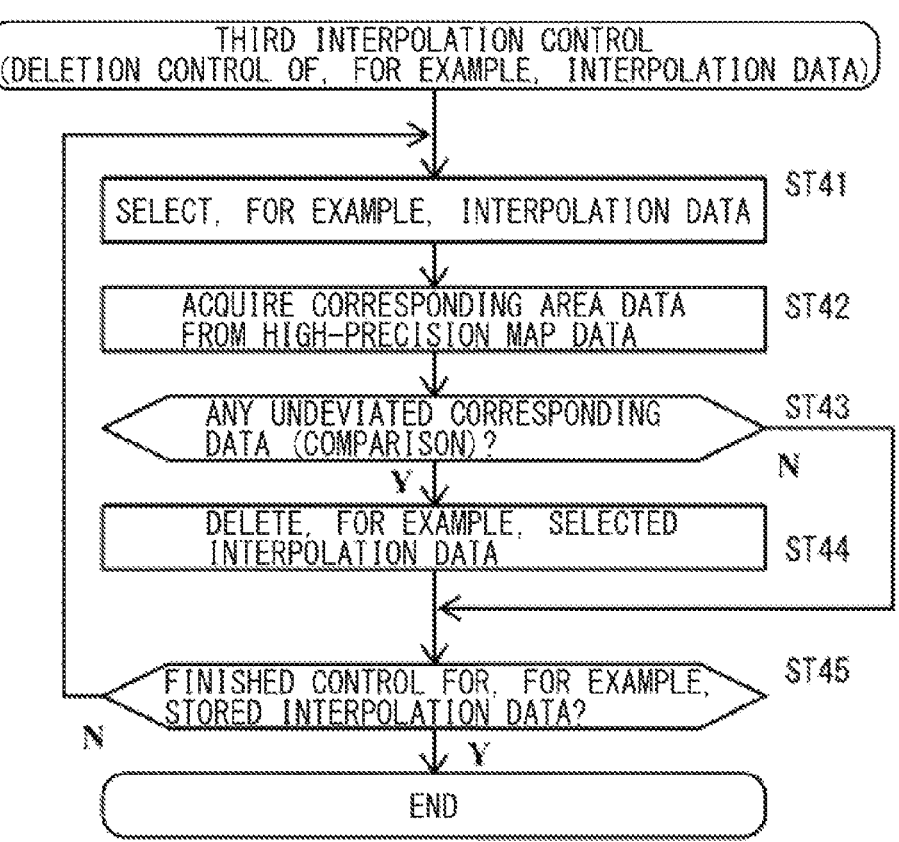

THIRD INTERPOLATION CONTROL
(DELETION CONTROL OF, FOR EXAMPLE, INTERPOLATION DATA)

SELECT, FOR EXAMPLE, INTERPOLATION DATA　　ST41

ACQUIRE CORRESPONDING AREA DATA
FROM HIGH-PRECISION MAP DATA　　ST42

ANY UNDEVIATED CORRESPONDING
DATA (COMPARISON)?　　ST43

Y　　　N

DELETE, FOR EXAMPLE, SELECTED
INTERPOLATION DATA　　ST44

FINISHED CONTROL FOR, FOR EXAMPLE,
STORED INTERPOLATION DATA?　　ST45

N　　Y

END

[ FIG. 10 ]
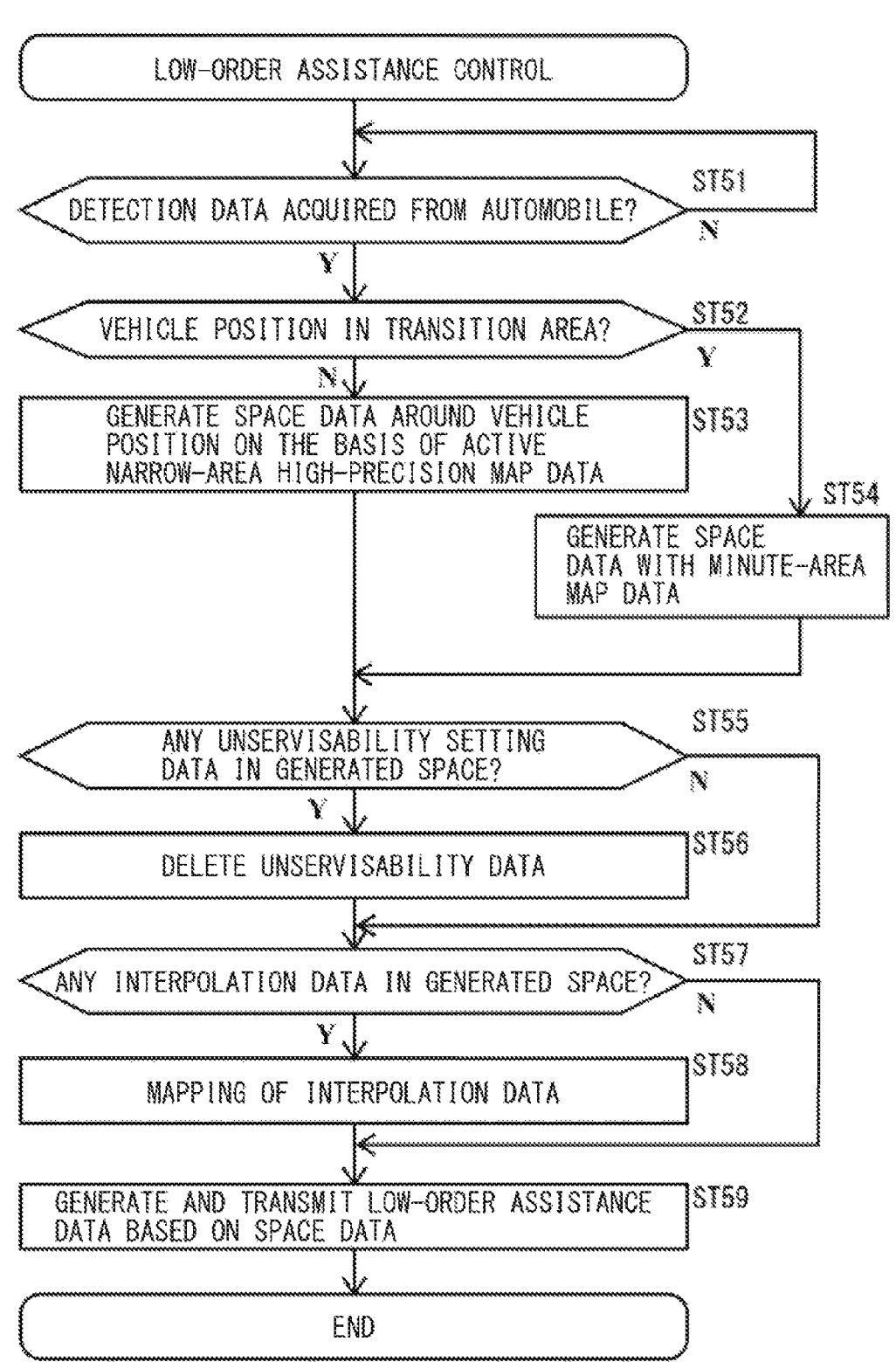

[ FIG. 11 ]

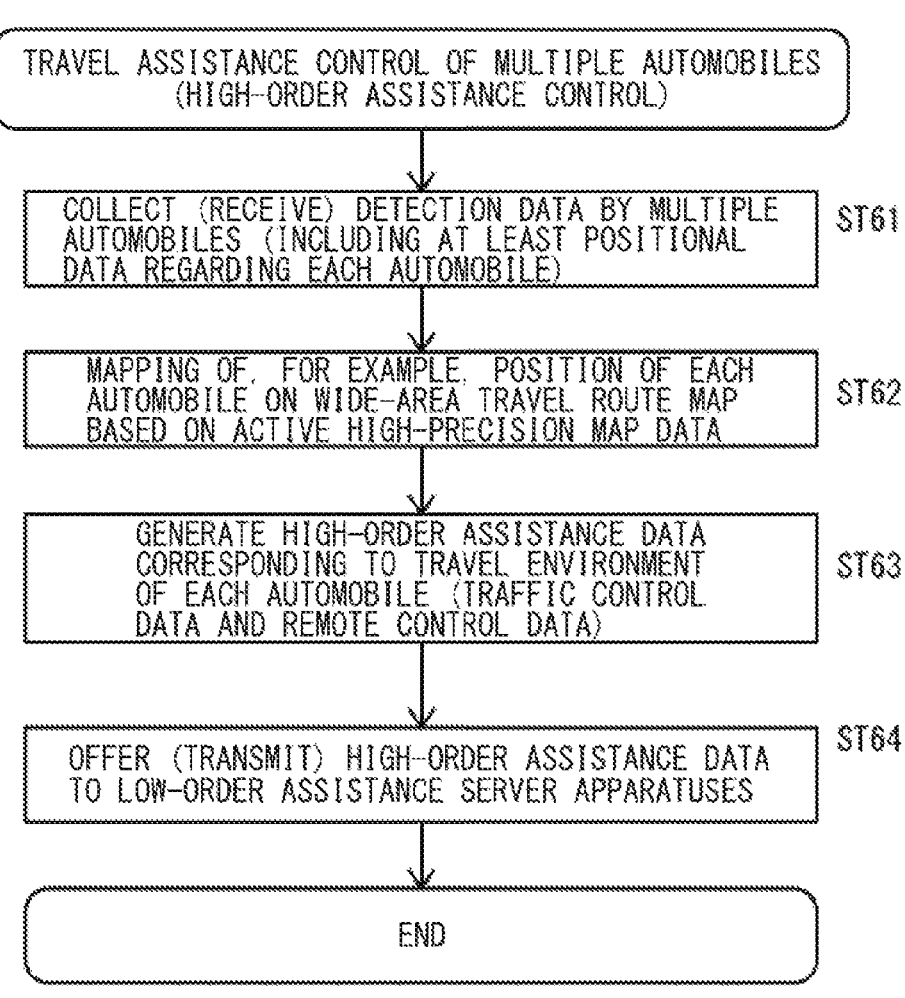

TRAVEL ASSISTANCE CONTROL OF MULTIPLE AUTOMOBILES
(HIGH-ORDER ASSISTANCE CONTROL)

COLLECT (RECEIVE) DETECTION DATA BY MULTIPLE
AUTOMOBILES (INCLUDING AT LEAST POSITIONAL
DATA REGARDING EACH AUTOMOBILE)    ST61

MAPPING OF, FOR EXAMPLE, POSITION OF EACH
AUTOMOBILE ON WIDE-AREA TRAVEL ROUTE MAP
BASED ON ACTIVE HIGH-PRECISION MAP DATA    ST62

GENERATE HIGH-ORDER ASSISTANCE DATA
CORRESPONDING TO TRAVEL ENVIRONMENT
OF EACH AUTOMOBILE (TRAFFIC CONTROL
DATA AND REMOTE CONTROL DATA)    ST63

OFFER (TRANSMIT) HIGH-ORDER ASSISTANCE DATA
TO LOW-ORDER ASSISTANCE SERVER APPARATUSES    ST64

END

[ FIG. 12 ]
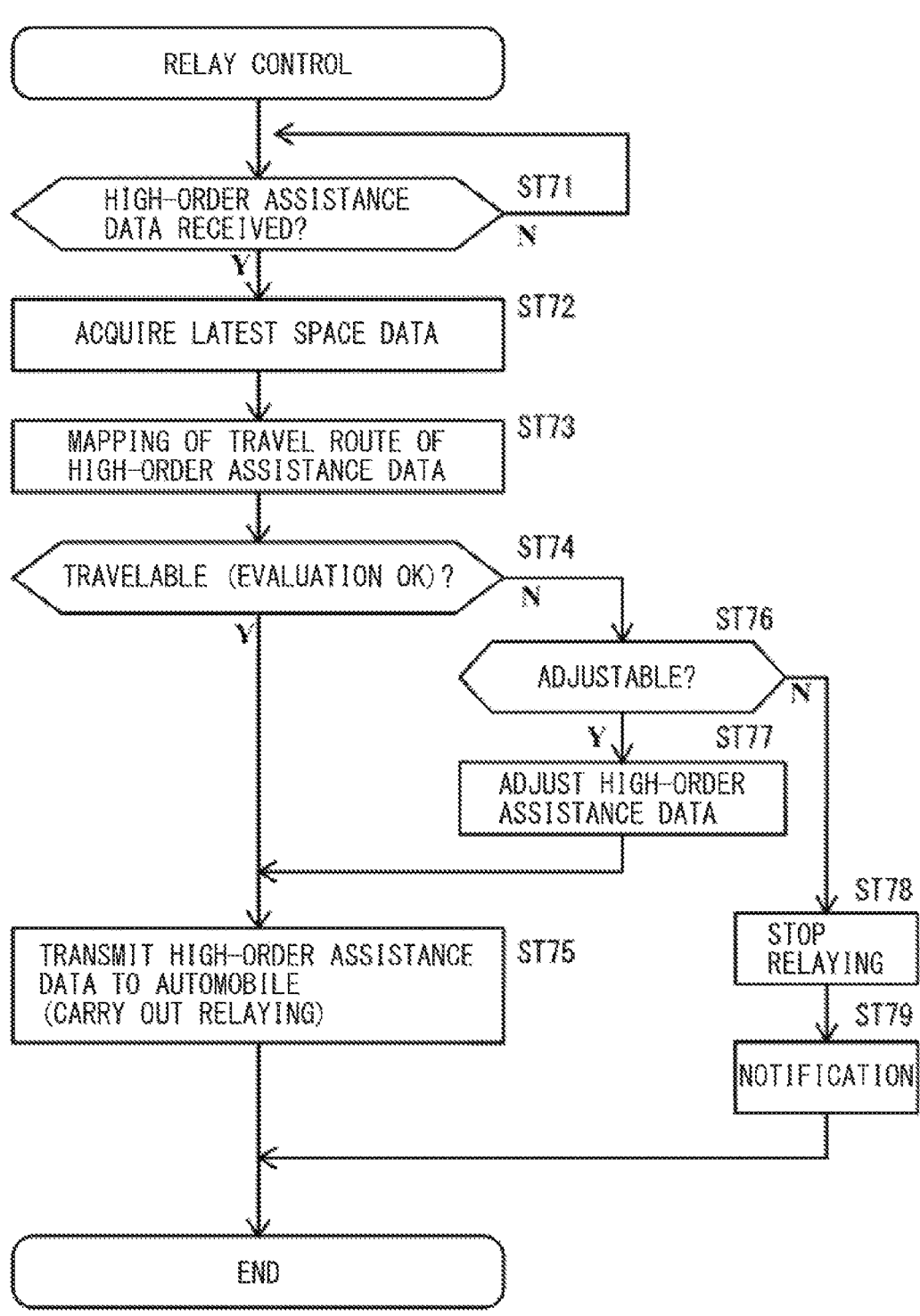

[ FIG. 13 ]
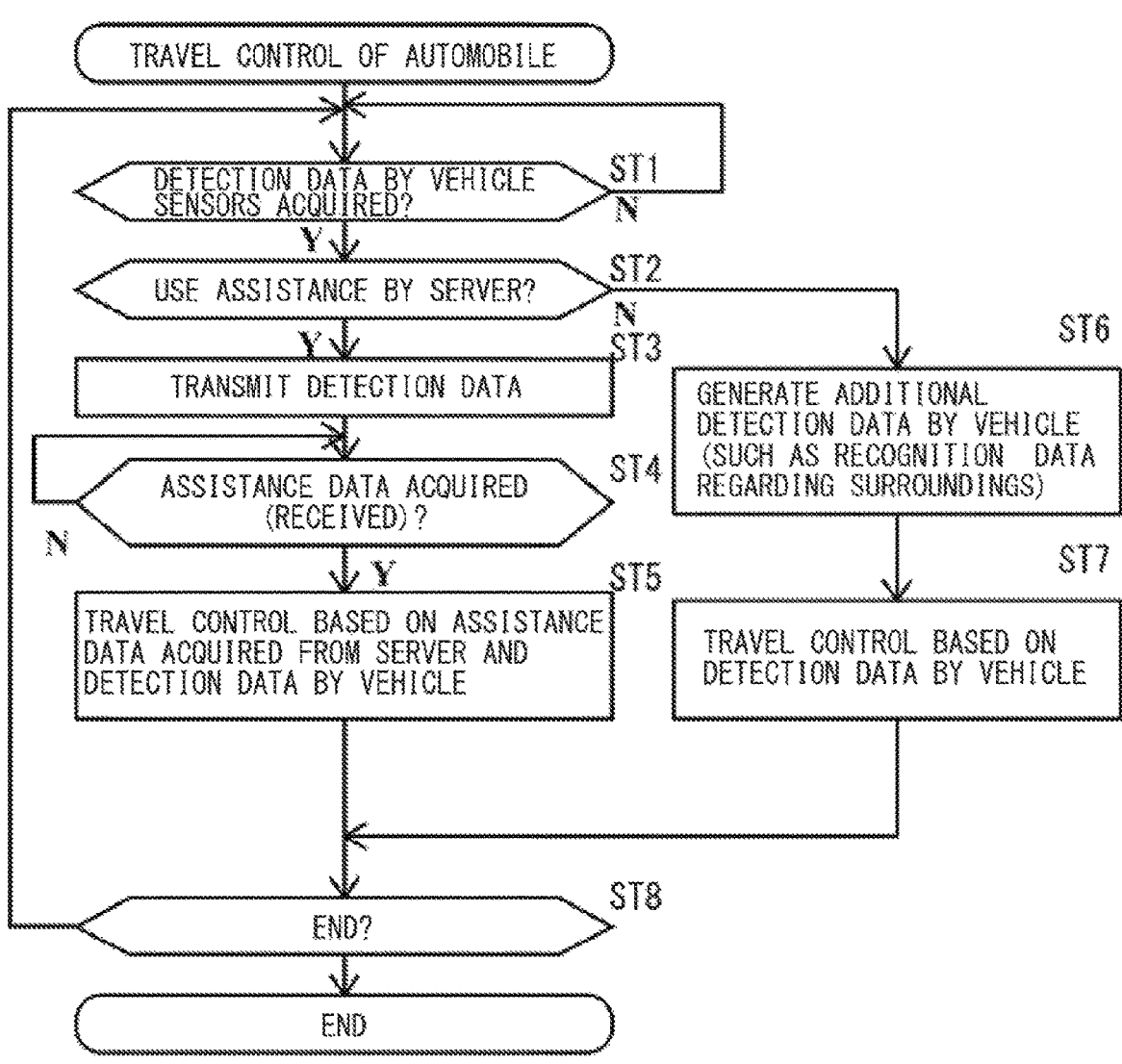

[ FIG. 14 ]
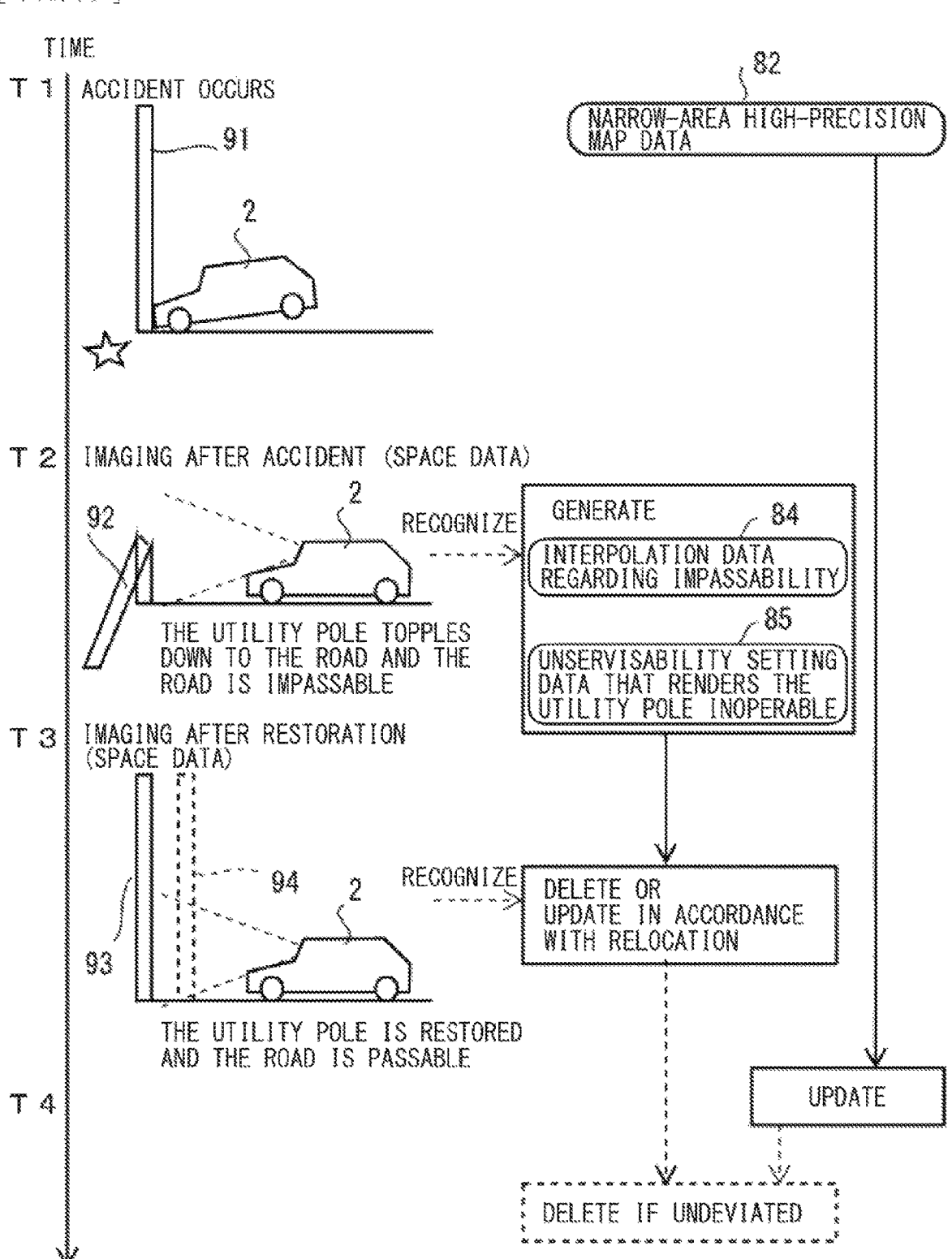

VEHICLE TRAVEL CONTROL ASSISTANCE SYSTEM HAVING MAP UPDATE FUNCTION, MAP UPDATE SERVER APPARATUS, AND ASSISTANCE SERVER APPARATUS

CROSS-REFERENCE TO RELATED APPLICATIONS

This application is the U.S. National Phase under 35 U.S.C. § 371 of International Application No. PCT/JP2021/040677, filed on Nov. 4, 2021.

TECHNICAL FIELD

The invention relates to a vehicle travel control assistance system having a map update function, a map update server apparatus, and an assistance server apparatus.

BACKGROUND ART

In vehicles, developments for high-level automated driving have been in progress. The higher the level of the automated driving, the heavier the demands and burdens on vehicles.

Accordingly, it is conceivable to reduce the demands and burdens on vehicles with the use of an assistance server apparatus that assists in a travel control of a vehicle.

Basically, it suffices that the assistance server apparatus generates data that assists in the travel control of the vehicle and transmits the data to the vehicle. This makes it possible for the vehicle to control its travel with the use of the data acquired from the assistance server apparatus without carrying out processing of generating, by itself, the data that is acquirable from the assistance server apparatus.

Patent Literature 1 discloses an update of map data by such an assistance server apparatus.

Moreover, to raise the level of assistance in the travel control of the vehicle by the assistance server apparatus, it is conceivable to use multiple assistance server apparatuses, e.g., a high-order assistance server apparatus and a low-order assistance server apparatus.

In this case, the multiple assistance server apparatuses generate the data that assists in the travel control of the vehicle on the basis of respective pieces of high-precision map data, and transmit the data to the vehicle.

The vehicle that acquires multiple pieces of the assistance data from these multiple assistance server apparatuses is expected to be able to make the travel control of a higher level with the use of the multiple pieces of the assistance data without carrying out the processing of generating, by itself, the multiple pieces of the assistance data.

CITATION LIST

Patent Literature

Patent Literature 1: Japanese Unexamined Patent Application Publication No. 2020-095250

SUMMARY OF INVENTION

Problem to be Solved by the Invention

However, there is a case where, while the multiple assistance server apparatuses each generate the data that assists in the travel control of the single vehicle on the basis of the respective pieces of the high-precision map data, and transmit the data to the vehicle, it is necessary to update the high-precision map data because of, for example, construction work to change a road shape. In this case, the update of the high-precision map data held in each of the multiple assistance server apparatuses may involve a problem different from the case where the single assistance server apparatus assists in the travel control of the vehicle as in Patent Literature 1.

For example, it is necessary to basically simultaneously update the multiple pieces of the high-precision map data held in the multiple assistance server apparatuses that assist in the travel control of the single vehicle. Updating one piece of the high-precision map data, and thereafter, updating another piece of the high-precision map data inhibit consistency of contents of the assistance by the multiple assistance server apparatuses from being ensured in that period of time. If a certain degree of consistency is not ensured between the multiple pieces of the high-precision map data, it becomes difficult for the multiple assistance server apparatuses to provide optimal assistance in the travel control of the single vehicle. However, it is not very easy to simultaneously update the multiple pieces of the high-precision map data held separately in the multiple assistance server apparatuses.

In addition, for example, the actual situation of a road on which vehicles can travel varies with various factors. For example, a vehicle may collide with a utility pole or a tree, and the utility pole or the tree may topple down to the road. There may be falling objects on the road, or other vehicles may be parked partly on the street. Traffic signals may be relocated or newly installed. These changes in the situation because of various factors include temporary ones, and it may be practically impossible to keep on updating the multiple pieces of the high-precision map data in the multiple assistance server apparatuses simultaneously and promptly in response to such changes.

Moreover, during the update processing of the high-precision map data, each of the multiple assistance server apparatuses is not able to provide the assistance in the travel control of the vehicle with the use of the high-precision map data. Each of the assistance server apparatuses has to suspend the assistance in the travel control of the vehicle before a start of the update of the high-precision map data, and resume the assistance in the travel control of the vehicle after an end of the update of the high-precision map data.

As described, it is necessary to improve a vehicle travel control assistance system having a map update function.

Means for Solving the Problem

A vehicle travel control assistance system having a map update function according to an aspect of the invention includes assistance server apparatuses and a map update server apparatus. The assistance server apparatuses include respective server storages holding high-precision map data, and are configured to generate data that assists in a travel control of a vehicle, based on respective pieces of the high-precision map data and transmit the data to the vehicle. The map update server apparatus includes a server communication unit configured to be coupled to the assistance server apparatuses, and is configured to update the respective pieces of the high-precision map data held in the assistance server apparatuses. The respective pieces of the high-precision map data held in the assistance server apparatuses include narrow-area high-precision map data and wide-area high-precision map data regarding a wide area including an area for the narrow-area high-precision map data. The narrow-area high-precision map data is held in a low-order one of the assistance server apparatuses. The wide-area high-precision map data is held in a high-order one of the assistance server apparatuses. The map update server apparatus is configured to update the narrow-area high-precision map data and the wide-area high-precision map data based on common data.

A map update server apparatus according to an aspect of the invention is a map update server apparatus to be used in a vehicle travel control assistance system. The vehicle travel control assistance system includes assistance server apparatuses that each is configured to generate data that assists in a travel control of a vehicle, based on high-precision map data and transmit the data to the vehicle. The map update server apparatus includes: a server communication unit configured to be coupled to the assistance server apparatuses: and a controller is configured to update multiple pieces of the high-precision map data held in the respective assistance server apparatuses. The multiple pieces of the high-precision map data held in the respective assistance server apparatuses include narrow-area high-precision map data and wide-area high-precision map data regarding a wide area including an area for the narrow-area high-precision map data. The narrow-area high-precision map data is held in a low-order one of the assistance server apparatuses. The wide-area high-precision map data is held in a high-order one of the assistance server apparatuses. The controller is configured to update the narrow-area high-precision map data and the wide-area high-precision map data based on common data.

An assistance server apparatus according to an aspect of the invention is an assistance server apparatus configured to generates data that assists in a travel control of a vehicle and transmits the data to the vehicle, in a travel control assistance system that assists in the travel control of the vehicle. The assistance server apparatus includes: a server storage that holds high-precision map data, to allow the high-precision map data to be updatable by a map update server apparatus provided in the travel control assistance system: and a controller configured to generate the data that assists in the travel control of the vehicle, with the use of the high-precision map data held in the server storage. The server storage holds interpolation data that complements the high-precision map data, unserviceability setting data that renders unserviceable a portion of the high-precision map data, or minute-area map data regarding a minute area as a portion of an area for the high-precision map data, together with the high-precision map data that is updatable by the map update server apparatus provided in the vehicle travel control assistance system. The controller is configured to generate the data that assists in the travel control of the vehicle, with the preferential use of the interpolation data, the unserviceability setting data, or the minute-area map data held in the server storage, to the updatable high-precision map data.

Effects of the Invention

In the invention, the vehicle travel control assistance system includes the map update server apparatus, together with the assistance server apparatuses. The assistance server apparatuses generate the data that assists in the travel control of the vehicle, on the basis of the respective pieces of the high-precision map data and transmit the data to the vehicle. The map update server apparatus updates multiple pieces of the high-precision map data held in the assistance server apparatuses. Moreover, the multiple pieces of the high-precision map data held in the assistance server apparatuses include the narrow-area high-precision map data and the wide-area high-precision map data regarding the wide area including the area for the narrow-area high-precision map data. The narrow-area high-precision map data is held in the low-order one of the assistance server apparatuses. The wide-area high-precision map data is held in the high-order one of the assistance server apparatuses.

Moreover, in the invention, the map update server apparatus updates the narrow-area high-precision map data and the wide-area high-precision map data on the basis of the common data. Thus, the updated narrow-area high-precision map data held in the low-order one of the assistance server apparatuses, and the updated wide-area high-precision map data held in the high-order one of the assistance server apparatuses are updated to ensure or maintain a certain degree of consistency between them.

In contrast, there is possibility that, for example, the map update server apparatus updates the narrow-area high-precision map data out of the narrow-area high-precision map data and the wide-area high-precision map data, and afterwards, updates the wide-area high-precision map data with the use of the updated narrow-area high-precision map data. However, generally, the narrow-area high-precision map data includes minute data as compared to the wide-area high-precision map data. Accordingly, in the case where the high-precision map data is updated in order from the narrow-area high-precision map data, there is possibility of difficulty in identifying uniquely a portion of the wide-area high-precision map data corresponding to an updated portion of the updated narrow-area high-precision map data. In the invention, it is possible to optimally update the multiple pieces of the high-precision map data without such a consistency problem.

Moreover, in the assistance server apparatuses of the travel control assistance system of the invention, the certain degree of consistency is ensured between the multiple pieces of the high-precision map data. Hence, it is possible to generate the multiple pieces of the assistance data having the certain degree of consistency between them, and transmit them to each vehicle. The vehicles are able to make the travel control with the use of the acquired multiple pieces of the assistance data, assuming that the certain degree of consistency is ensured between the multiple pieces of the assistance data acquired from the assistance server apparatuses.

Hence, in the invention, it is possible to improve the vehicle travel control assistance system having the map update function.

BRIEF DESCRIPTION OF DRAWINGS

FIG. 1 is a configuration diagram of a control system of an automobile in an embodiment of the invention.

FIG. 2 is a configuration diagram of a travel control assistance system that assists in a travel control of the automobile according to the embodiment of the invention.

FIG. 3 is an explanatory diagram of a hardware configuration of a server apparatus to be used as various server apparatuses in FIG. 2.

FIG. 4 is an explanatory diagram of an example of corresponding relation between wide-area high-precision map data held in a high-order assistance server apparatus in FIG. 2 and multiple pieces of narrow-area high-precision map data held in low-order assistance server apparatuses.

FIG. 5 is an explanatory diagram of a map update function in the travel control assistance system in FIG. 2.

FIG. 6 is a flowchart of an update control of multiple pieces of the high-precision map data, by a map update server apparatus in FIG. 5.

FIG. 7 is a flowchart of a first interpolation control (user map addition control), by an interpolation controller in FIG. 5.

FIG. 8 is a flowchart of a second interpolation control (sequential interpolation control), by the interpolation controller in FIG. 5.

FIG. 9 is a flowchart of a third interpolation control (deletion control of, for example, the interpolation data), by the interpolation controller in FIG. 5.

FIG. 10 is a flowchart of a low-order assistance control in consideration of a map update, by the low-order assistance server apparatus in FIG. 5.

FIG. 11 is a flowchart of a high-order assistance control in consideration of the map update, by the high-order assistance server apparatus in FIG. 5.

FIG. 12 is a flowchart of a relay control in consideration of the map update, by the low-order assistance server apparatus in FIG. 5.

FIG. 13 is a flowchart of the travel control of the automobile adapted for the travel control assistance system in FIG. 2.

FIG. 14 is a diagram that illustrates a flow of an example of the map update, in the travel control assistance system of the embodiment.

MODES FOR CARRYING OUT THE INVENTION

In the following, some embodiments of the invention are described with reference to the drawings.

FIG. 1 is a configuration diagram of a control system 10 of an automobile 2 in an embodiment of the invention.

The automobile 2 in FIG. 1 is an example of a vehicle. Other examples of the vehicle include a motorcycle, a cart, a personal mobility, a vehicle that travels on a track.

The control system 10 of the automobile 2 in FIG. 1 includes a driving controller 11, a steering controller 12, a braking controller 13, a driving operation unit 14, a vehicle sensor unit 15, a travel controller 16, a vehicle communication unit 17, and a central gateway apparatus to which these are coupled with the use of cables 19. The control system 10 of the automobile 2 may include other unillustrated controllers.

The central gateway apparatus 18 and the cables 19 constitute a vehicle network of the automobile 2. The vehicle network is compliant with, for example, the CAN (Controller Area Network) standard or the LIN (Local Interconnect Network) standard. In addition, the vehicle network may be compliant with, for example, the LAN (Local Area Network) standard or the wireless communication standard. To the controllers coupled to the vehicle network, respective IDs as identification data different from one another are assigned. Each of the controllers coupled to the vehicle network basically periodically outputs packetized data to another of the controllers. To the packet, ID (identification) data regarding the controller as a source of the output, and ID data regarding the controller as a destination of the output are added. Each of the other controllers monitors the cable 19 to which it is coupled. In a case where the ID data as the destination of the output of the packet on the cable 19 includes its own ID data or predetermined broadcast ID data, the relevant one of the other controllers acquires the data in the packet, and carries out processing based on the data. Moreover, the central gateway apparatus

18 monitors the cables 19 to which it is coupled. In a case where the controller as the destination of the output is coupled to the cable 19 different from the cable 19 to which the controller as the source of the output is coupled, the central gateway apparatus 18 carries out a routing control to the cable 19 to which the controller as the destination of the output is coupled. With such relay processing by the central gateway apparatus 18, each of the controllers is able to carry out packet-based data input and output with the other controllers coupled to the different cable 19.

The vehicle communication unit 17 is a communication unit to communicate with outside the automobile 2. On a road or in an area where the automobile 2 travels, a carrier communication network 6 for mobile terminals is often provided. Other examples of the base station 3 with which the automobile 2 is configured to communicate include the base station 3 of an intelligent transportation system provided along a road such as an expressway. The vehicle communication unit 17 may establish a communication path by performing wireless communication with these base stations 3, and perform bidirectional communication with, for example, a server apparatus 60 with the use of the communication path and the base stations 3. Upon acquiring data from the vehicle network, the vehicle communication unit 17 transmits a packet including the acquired data to the base station 3 or the server apparatus 60 with the use of the established communication path. Upon acquiring data from the vehicle network, the vehicle communication unit 17 receives a packet from the base station 3 or the server apparatus 60 through the established communication path, and outputs data included in the acquired packet to the vehicle network.

To the vehicle sensor unit 15, various vehicle sensors provided in the automobile 2 are coupled. Here, an acceleration rate sensor 21, corner radar 22, a stereo camera 23, Lidar 24, an omnidirectional camera 25, and a GNSS receiver 26 are illustrated as the vehicle sensors. The vehicle sensor unit 15 outputs, to the vehicle network, detection data by the vehicle sensors coupled to the vehicle sensor unit 15. Moreover, the vehicle sensor unit 15 may generate secondary detection data on the basis of the detection data by the vehicle sensors and output the generated secondary detection data to the vehicle network.

The GNSS receiver 26 receives radio waves from GNSS (Global Navigation Satellite System) satellites 110 and obtains latitude, longitude, and altitude as a current position of the vehicle, and the current time.

The acceleration rate sensor 21 detects an acceleration rate of the automobile 2. Examples of the acceleration rate sensor 21 include those of an axial type that detect a longitudinal acceleration rate, a lateral acceleration rate, and a vertical acceleration rate of the automobile 2. Time-integrating the acceleration rate makes it possible to obtain a speed of the automobile 2. In this case, the vehicle sensor unit 15 is able to detect motions of the automobile 2 in a yaw direction, a pitch direction, and a roll direction on the basis of detection values of the acceleration rate sensor 21.

The corner radar 22 is provided at four corners of the automobile 2, i.e., at right front, left front, right rear, and left rear corners. The corner radar 22 detects a distance to a surrounding object approaching the corner of the automobile 2 from outside. Examples of surrounding objects include other moving objects such as preceding vehicles, and fixed objects such as traffic lights provided at, for example, intersections of roads.

The stereo camera 23 includes, for example, a pair of cameras spaced apart by a predetermined distance. The stereo camera 23 captures, with the pair of cameras, an outside view of the vehicle in a frontward direction, i.e., a direction of travel of the automobile 2. For example, the vehicle sensor unit 15 may analyze captured images by, for example, pattern matching, recognize a predetermined three-dimensional surrounding object such as lane lines on both left and right sides of a travel route along which the vehicle is traveling, or preceding vehicles, and generate the detection data regarding a direction and an interval from the vehicle with respect to the object outside the vehicle on the basis of a difference in the positions of the recognized surrounding object in the captured images by the pair of cameras.

The omnidirectional camera 25 captures images of the surroundings of the automobile 2. The omnidirectional camera 25 may include multiple cameras configured to capture images within respective predetermined angles of view.

The Lidar 24 is provided in a front part of the automobile 2. The Lidar 24 scans, with detection waves, a frontward view of the automobile 2 in the direction of travel of the automobile 2 and detects space data regarding presence or absence of reflected waves and a distance. In a case with no three-dimensional surrounding objects in a direction in which the detection waves are outputted, no reflected waves are obtained. In a case with a three-dimensional surrounding object in the direction in which the detection waves are outputted, it is possible to detect a relative distance to the surrounding object by a period until reception of the reflected waves.

The stereo camera 23, the omnidirectional camera 25, and the Lidar 24 detect the space data regarding the surroundings of the automobile 2. The Lidar 24 is usually configured to acquire the space data regarding a range of a longer distance than the stereo camera 23 or the omnidirectional camera 25. However, the stereo camera 23 and the omnidirectional camera 25 of high resolution are configured to obtain, by using an optical member such as a telephoto lens in combination, on the basis of images of the optical member, captured images of a surrounding object at a great distance equivalent to the Lidar 24, by image analysis, with recognizable resolution.

In a case where a level of automated driving to be carried out by the travel controller 16 is, for example, the level 3 or higher, it is necessary for the vehicle sensor unit 15 to carry out a control of analyzing the space data regarding the surroundings, and generating recognition data regarding the travel route around the automobile 2 or recognition data regarding surrounding objects around the automobile 2, on the basis of, for example, an instruction by the travel controller 16.

To the driving operation unit 14, unillustrated members such as a steering wheel, a brake pedal, an accelerator pedal, and a shift lever are coupled as operation members for a user to control the travel of the automobile 2. When the operation member is operated, the driving operation unit 14 outputs data including, for example, presence or absence of an operation and an amount of the operation, to the vehicle network. Moreover, the driving operation unit 14 may carry out processing related to the operations on the operation members, and incorporate the processing result in the data. For example, in a situation where there is another automobile 2 or a fixed object in the direction of travel of the automobile 2, when the accelerator pedal is operated, the driving operation unit 14 may determine an abnormal operation, and incorporate the determination result in the data.

The travel controller 16 includes a vehicle memory 31 and a vehicle ECU (Electronic Control Unit) 32.

The vehicle memory 31 may include, for example, a semiconductor memory or an HDD. The vehicle memory 31 holds, for example, a program to control the travel of the automobile 2, and data to be used in the control. Here, vehicle high-precision map data 33 regarding an area where the automobile 2 travels is given as an example. The vehicle high-precision map data 33 may be, for example, cached from an unillustrated map server apparatus with the use of a wireless communication unit or held in a portable semiconductor memory.

The vehicle ECU 32 is a computer device of the automobile 2. The vehicle ECU 32 reads and executes the program held in the vehicle memory 31. Thus, the vehicle ECU 32 functions as the travel controller 16 that makes an overall control of the travel of the automobile 2.

The vehicle ECU 32 as the travel controller 16 generates a control value that controls the travel of the automobile 2, and outputs the control value to the driving controller 11, the steering controller 12, and the braking controller 13.

The driving controller 11 controls operation of an unillustrated power source of the automobile 2. Examples of the power source of the automobile 2 includes an engine and a motor. The driving controller 11 controls the operation of the power source on the basis of the control value generated by the travel controller 16.

The steering controller 12 controls operation of an unillustrated steering device of the automobile 2. Examples of the steering device of the automobile 2 include those of a by-wire type that controls a direction of steering and an amount of steering in accordance with an amount of rotation of the motor. The steering controller 12 controls the operation of the steering device on the basis of the control value generated by the travel controller 16.

The braking controller 13 controls operation of an unillustrated braking device of the automobile 2. Examples of the braking device of the automobile 2 include those of a by-wire type that controls hydraulic pressure by the amount of rotation of the motor. The braking controller 13 controls the operation of the braking device on the basis of the control value generated by the travel controller 16.

By the operation of these controllers that carry out the controls, the automobile 2 is able to travel in accordance with the travel control by the travel controller 16.

Here, the travel controller 16 controls the travel of the automobile 2 by generating the control value corresponding to data regarding a driving operation by a driver inputted from the driving operation unit 14. In addition, the travel controller 16 may control the travel of the automobile 2 by generating the control value for driver assistance that adjusts the driving operation by the driver, or may control the travel of the automobile 2 by generating the control value by highly autonomous automated driving that is not based on the driving operation by the driver. Driver assistance basically corresponds to the automated driving of the level 1 and the level 2 that controls the travel of the automobile 2 under monitoring by the driver. Highly autonomous automated driving basically corresponds to the automated driving of the level 3 or higher that controls the travel of the automobile 2 under monitoring by the control system 10 of the automobile 2.

The Ministry of Land, Infrastructure, Transport and Tourism of Japan classifies the automated driving of the automobile 2 into the level 1 for basic driver assistance to the level 5 for highly autonomous fully automated driving.

The automated driving of the level 1 (L1) refers to carrying out driver assistance in one of, for example, automatic braking, preceding vehicle following, and lane keeping under monitoring by the driver.

The automated driving of the level 2 (L2) refers to carrying out driver assistance, under a specific condition, in a combination of two or more of, for example, automatic braking, preceding vehicle following, and lane keeping under monitoring by the driver. Alternatively, the automated driving of the level 2 refers to carrying out driving assistance under a specific condition such as automatic overtaking on an expressway or diverging and merging on an expressway, under monitoring by the driver.

The automated driving of the level 3 (L3) is intended for a continuous travel control of the automobile 2 under monitoring by the control system 10 of the automobile 2 in which the control system 10 requests the driver to intervene on the basis of its monitoring determination. In this case, in a case with an intervention request from the control system 10 of the automobile 2, the driver is requested to promptly respond to the request with responsibility. As the automated driving of the level 3, for example, automated driving on an expressway may be assumed.

The automated driving of the level 4 (L4) is intended for a continuous travel control of the automobile 2 under monitoring by the control system 10 of the automobile 2 in which the control system 10 is able to carry out a complete travel control under a specific condition without requesting the driver to intervene. In this case, the driver is not requested to intervene by the control system 10 of the automobile 2 under the specific condition. If not under the specific condition, there is possibility that the driver may receive the intervention request from the control system 10 of the automobile 2, and the driver is requested to promptly respond to the request with responsibility. As the automated driving of the level 4, for example, an unmanned automated driving transportation service in a limited area, or a fully automated driving on an expressway may be assumed.

The automated driving of the level 5 (L5) refers to completely carrying out all travel controls constantly under monitoring by the control system 10 of the automobile 2. In this case, the driver does not receive the intervention request from the control system 10 of the automobile 2 while the automobile 2 is traveling.

As described, the travel controller 16 of the automobile 2 is requested to carry out the travel control for the automated driving of these multiple levels on the basis of various kinds of the detection data detected by the vehicle sensors.

Moreover, the travel controller 16 may carry out a control of switching the level of the automated driving during the travel in accordance with, for example, the travel environment of the vehicle, a state of the vehicle, and a state of the driver, on the basis of, for example, the detection data acquirable from the vehicle sensor unit 15.

The travel controller 16 may determine, for example, the travel environment of the vehicle, the state of the vehicle, and the state of the driver, on the basis of, for example, the detection data acquired from, for example, the vehicle sensor unit 15, and carry out the automated driving of the highest level that is available under the determination result.

As described, the control system 10 of the automobile 2 is requested to carry out a more complicated and more advanced control as it attempts to cope with the automated driving of the higher levels.

Moreover, to put the advanced automated driving into practical use in the automobile 2, it is necessary to provide the automobile 2 with, at least, a large number of the vehicle sensors as described above, to obtain data necessary for the advanced automated driving.

For example, in carrying out the travel control of the higher levels such as the level 3 and the level 4, it is necessary for the control system 10 of the automobile 2 to include, for example, the Lidar 24 and the omnidirectional camera 25 that detect the surroundings of the automobile 2, and generate, with a high degree of certainty, the recognition data regarding the travel route around the automobile 2 and various surrounding objects on the basis of the space data regarding the surroundings detected by the Lidar 24 and the omnidirectional camera 25. In addition, the control system 10 of the automobile 2 has to carry out the travel control on the basis of the recognition data, to maintain the travel along the lane while, for example, avoiding an obstacle. This means a significant increase in a processing load on the automobile 2, as compared to a case where the traveling control of the lower level such as the level 1 and the level 2 can be implemented by, for example, a lane keeping control based on pattern recognition of lanes based on captured images at short distances or an adaptive cruise control (preceding vehicle following control) based on pattern recognition of a preceding vehicle based on the captured images at short distances. In the travel control of the higher levels such as the level 3 and the level 4, it is necessary to raise the certainty of recognition by the similar recognition processing with processing using machine-learned artificial intelligence.

Moreover, the automobile 2 is intended to move, and it is necessary to operate a large number of the vehicle sensors at high speeds to constantly monitor the situation around the automobile 2 while traveling basically in a parasitic state. In the automobile 2 adapted for the travel control of the higher levels, it is necessary to repeatedly detect the detection data based on detection values by the large number of the vehicle sensors at short-time intervals, and to repeatedly carry out the travel control on short control cycles on the basis of the detection data repeatedly detected at the short-time intervals. As the automobile is adapted for the automated driving of the higher level, the performance desired for the automobile 2 becomes significantly higher.

Thus, in the automobile 2 adapted for the automated driving of the high level, it is conceivable to reduce the burden on the automobile 2 while traveling by assisting in the travel control of the automobile 2 that carries out the travel control of the high level, with the use of a server apparatus configured to communicate with the automobile 2 through the base station 3.

FIG. 2 is a configuration diagram of a travel control assistance system 1 that assists in the travel control of the automobile 2 according to the embodiment of the invention.

The travel control assistance system 1 in FIG. 2 includes a high-order assistance server apparatus 7 and low-order assistance server apparatuses 5, as assistance server apparatuses that assist in the travel control of the automobile 2.

Moreover, in FIG. 2, GNSS satellites 110 are also illustrated.

The low-order assistance server apparatuses 5 are basically provided in one-to-one corresponding relation to the base stations 3. Such low-order assistance server apparatuses 5 may be installed together with the base stations 3 for 5G as, for example, base station server apparatuses for the respective base stations 3 for 5G. It is to be noted that the low-order assistance server apparatuses 5 may be provided in one-to-many corresponding relation to the base stations 3. The low-order assistance server apparatuses 5 are coupled to the respective corresponding base stations 3 by carrier communication cables 4. The low-order assistance server apparatuses 5 each directly transmit and receive data to and from the vehicle communication unit 17 of the automobile 2 in the zone of the base station 3 by wireless communication through the base station 3. The low-order assistance server apparatus 5 may establish an individual secure communication path with the vehicle communication unit 17 of the automobile 2 by, for example, SSL (Secure Sockets Layer)/TLS (Transport Layer Security)-VPN (Virtual Private Network) communication.

The low-order assistance server apparatus 5 assists in the travel control of the automobile 2 traveling in a narrow area included in the zones of the one or more base stations 3 coupled to the low-order assistance server apparatus 5.

The high-order assistance server apparatus 7 is coupled to the low-order assistance server apparatuses 5 through the carrier communication network 6. The carrier communication cable 4 mentioned above may constitute a portion of the carrier communication network 6. Moreover, the high-order assistance server apparatus 7 may be coupled to the low-order assistance server apparatuses 5 through, for example, the Internet coupled to the carrier communication network 6. The high-order assistance server apparatus 7 may establish individual secure communication paths with the low-order assistance server apparatuses 5 by IPsec (Security Architecture for Internet Protocol)-VPN communication. SSL/TLS-VPN involves encoding a payload of a packet used for communication, but IPsec-VPN communication does not involve it. The high-order assistance server apparatus 7 and the low-order assistance server apparatuses 5 are able to carry out stable small-delay communication.

The high-order assistance server apparatus 7 assists in the travel control of the automobile 2 traveling in a wide area made up of the narrow areas of the one or more low-order assistance server apparatuses 5 coupled to the high-order assistance server apparatus 7.

Moreover, the travel control assistance system 1 in FIG. 2 includes a map update server apparatus 8 that updates the vehicle high-precision map data 33 used in each of the assistance server apparatuses 5 and 7.

The map update server apparatus 8 is coupled to the carrier communication network 6. The map update server apparatus 8 is provided for the update of the vehicle high-precision map data 33 to be used distributively in the assistance server apparatuses including the high-order assistance server apparatus 7 and the low-order assistance server apparatuses 5.

FIG. 3 is an explanatory diagram of a hardware configuration of the server apparatus 60 that can be used as the various server apparatuses in FIG. 2.

The high-order assistance server apparatus 7, the low-order assistance server apparatuses 5, and the map update server apparatus 8 in FIG. 2 may basically have the hardware configuration in FIG. 3.

The server apparatus 60 in FIG. 3 includes a server communication unit 61, a server GNSS receiver 62, a server memory 63, a server CPU (Central Processing Unit) 64, and a server bus 65 to which these are coupled.

However, the low-order assistance server apparatuses 5 may include a dedicated base station communication unit 66 to communicate with the base station 3 separately from the server communication unit 61.

The base station communication unit 66 communicates with the vehicle communication unit 17 of the automobile 2 through the base station 3, and transmits and receives data to and from the vehicle communication unit 17.

The server communication unit 61 communicates with another server apparatus 68 used in the travel control assistance system 1, and transmits and receives data to and from the relevant server apparatus 68.

The server GNSS receiver 62 receives radio waves from the GNSS satellites 110 and obtains latitude, longitude, and altitude of the position of installation of the server apparatus 60, and the current time. The current time is basically the same as the time acquired by the GNSS receiver 26 of the control system 10 of each of the automobiles 2. This makes it possible for the server apparatus 60 and the automobile 2 to carry out their respective controls under the absolute time common to each other. For example, it is possible to use the detection time by the vehicle sensor unit 15 in the automobile 2, as it is, in the calculation with the time in the server apparatus 60.

The server memory 63 holds programs to be executed by the server CPU 64, and data. The server memory 63 may include, for example, a semiconductor memory and a HDD.

The server memory 63 may hold, for example, service-area high-precision map data 67 to be used by each of the assistance server apparatuses.

Here, the service-area high-precision map data 67 may be high-precision three-dimensional map data regarding a road on which the automobile 2 travels. The service-area high-precision map data 67 may be the same as the three-dimensional vehicle high-precision map data 33 available to the automobile 2.

The high-precision map data 33 and 67 include data indicating a centerline of each lane of the road on which the automobile 2 travels, and boundary lines of each lane. Moreover, at an intersection or a junction, the high-precision map data 33 and 67 may include a guideline for a right turn or a left turn, or a guideline for a lane change. The guideline has an inclination or a curve corresponding to a shape or a gradient of each lane of the road. In addition, the high-precision map data 33 and 67 may include data regarding surrounding objects recognizable from the automobile 2 while traveling, e.g., road signs, marks, traffic lights, utility poles, and standing trees.

The server CPU 64 reads the program from the server memory 63 and executes the program. Thus, in the server apparatus 60, a server controller is implemented.

The server CPU 64 as the server controller controls overall operation of the server apparatus 60.

For example, the server CPU 64 of the high-order assistance server apparatus 7 generates a travel route map on the basis of the service-area high-precision map data 67 regarding its wide service area. The server CPU 64 of the high-order assistance server apparatus 7 maps, for example, the current position included in the detection data collected from the multiple automobiles 2, and generates the travel environment of the multiple automobiles 2. Moreover, the server CPU 64 of the high-order assistance server apparatus 7 generates high-order assistance data regarding each of the automobiles 2 for safe travel in the generated travel environment. Here, the high-order assistance data may be, for example, data regarding a traffic control related to a movable range of each of the automobiles 2, or data regarding a remote control related to the control value used in the control in each of the automobiles 2.

In addition, for example, the server CPU 64 of the low-order assistance server apparatus 5 generates the space data regarding the surroundings of each of the automobiles 2 on the basis of the detection data collected from each of the automobiles 2, the recognition data regarding the travel route and the surrounding objects generated on the basis of the detection data, and the service-area high-precision map data 67 regarding its own narrow service area. Moreover, the server CPU 64 of the low-order assistance server apparatus 5 generates low-order assistance data regarding each of the automobiles 2 for the safe travel in the generated space data regarding the surroundings of each of the automobiles 2. Here, the low-order assistance data may be, for example, the control value for the travel to avoid the surrounding objects or to keep to the lane of the travel route.

In addition, for example, the server CPU 64 of the map update server apparatus 8 accesses each of the assistance server apparatuses 5 and 7 of the travel control assistance system 1 to update the high-precision map data 67 used in each of the assistance server apparatuses.

FIG. 4 is an explanatory diagram of an example of a corresponding relation between the wide service area for wide-area high-precision map data 81 held in the high-order assistance server apparatus 7 in FIG. 2, and the narrow service areas for multiple pieces of narrow-area high-precision map data 82 held in the low-order assistance server apparatuses 5.

In FIG. 4, a first narrow area 70 and a second narrow area 71 are horizontally adjacent to each other. The high-precision map data 67 regarding each of the narrow areas 70 and 71 is held in the server memories 63 of the respective low-order assistance server apparatuses 5.

A wide area 72 is a combined area of the first narrow area 70 and the second narrow area 71. The high-precision map data 67 regarding the wide area 72 is held in the server memory 63 of the high-order assistance server apparatus 7.

In this case, the low-order assistance server apparatus 5 for the first narrow area 70 on the right generates the low-order assistance data for each automobile 2 traveling in the first narrow area 70, with the use of the high-precision map data 67 regarding the first narrow area 70.

The low-order assistance server apparatus 5 for the second narrow area 71 on the left generates the low-order assistance data for each automobile 2 traveling in the second narrow area 71, with the use of the high-precision map data 67 regarding the second narrow area 71.

The high-order assistance server apparatus 7 generates the high-order assistance data for each automobile 2 traveling in the wide area 72, with the use of the high-precision map data 67 regarding the wide area 72. Here, the high-order assistance server apparatus 7 may generate the high-order assistance data for each automobile 2 traveling in an area in the wide area 72 except for the first narrow area 70 and the second narrow area 71. This makes it possible for the automobile 2 traveling in such an area to receive and acquire solely the high-order assistance data out of the low-order assistance data and the high-order assistance data.

Moreover, the automobile 2 travels, for example, from the right to the left of the wide area 72 with respect to the surface of the paper. In this case, first, the automobile 2 is able to receive the assistance in the travel control by the high-order assistance server apparatus 7 and the low-order assistance server apparatus 5 in the first narrow area 70.

Thereafter, the automobile 2 moves from the first narrow area 70 to the second narrow area 71. In this case, first, the automobile 2 is able to receive the assistance in the travel control by the high-order assistance server apparatus 7 and the low-order assistance server apparatus 5 in the second narrow area 71. In a case where the automobile 2 moves over the service areas, the assistance server apparatuses 5 and 7 from which the automobile 2 is able to receive the assistance are switched. Moreover, by keeping on traveling in the service area of any of the assistance server apparatuses 5 and 7, the automobile 2 is able to continue to receive the travel assistance by the travel control assistance system 1. This may lead to significant reduction in the burden on the travel control of the automobile 2.

As described, in the travel control assistance system 1 of this embodiment, the assistance server apparatuses 5 and 7 distributively use multiple pieces of the high-precision map data 67. Moreover, the high-order assistance server apparatus 7 and the low-order assistance server apparatus 5 use the high-precision map data 67 regarding the areas of different sizes.

Thus, for example, it is desired that the high-precision map data 82 regarding the adjacent narrow areas match highly precisely in terms of data regarding the boundary, to make it possible for the automobile 2 moving across the boundary to receive the continuous travel assistance.

In particular, it is desired that the narrow-area high-precision map data 82 and the higher-order narrow-area high-precision map data 82 match highly precisely an entirety of an overlap area between them.

Moreover, for example, in a case where a road shape is changed because of, for example, road construction, the high-precision map data 67 needs to be updated in accordance therewith.

Furthermore, on a road on which the automobile 2 travels, there are cases where a utility pole or a standing tree topples down to the road, cases where temporary but emergency construction is carried out on the road, or cases where the road becomes unusable due to an accident.

In addition, there are cases where a falling object is on the road, or cases where, for example, other automobiles 2 are parked partly on the street. There are also cases where traffic signals are relocated or newly installed.

It is desirable that the multiple pieces of the high-precision map data 67 be updated promptly in accordance with all these factors of the changes in the map.

Moreover, it is desired that the narrow-area high-precision map data 82 and the higher-order narrow-area high-precision map data 82 be updated simultaneously because data inconsistency therebetween may possibly inhibit the uniform travel assistance.

However, it is conceivably very difficult to realize the continuous update of the multiple pieces of the high-precision map data 67 in the assistance server apparatuses 5 and 7 simultaneously, promptly in response to the changes in the situation of the various factors in reality, inclusive of those temporary ones.

It follows that the travel control assistance system 1 temporarily stops the assistance service, to update the multiple pieces of the high-precision map data 67 used by the travel control assistance system 1. Moreover, the temporary stop of the service may possibly occur highly frequently each time the change in the situation of the various factors occurs in reality. There is possibility that provision of the assistance service is practically always stopped.

As described, the travel control assistance system 1 of the automobile 2 needs to be improved.

FIG. 5 is an explanatory diagram of a map update function in the travel control assistance system 1 in FIG. 2.

FIG. 5 illustrates the single low-order assistance server apparatus 5, the single high-order assistance server apparatus 7, and the map update server apparatus 8 in the travel control assistance system 1. Moreover, the automobile 2 is illustrated that receives the assistance in the travel control from the travel control assistance system 1.

The server memory 63 of the high-order assistance server apparatus 7 holds the wide-area high-precision map data 81.

The server memory 63 of the low-order assistance server apparatus 5 holds minute-area map data 83, interpolation data 84, and unserviceability setting data 85, in addition to the narrow-area high-precision map data 82.

Here, the minute-area map data 83 is, for example, map data regarding a minute area 74 as a portion of the second narrow area 71 in FIG. 4. Examples of such a minute area 74 include a parking lot, commercial facilities, gaming facilities, and a redevelopment area. In these minute areas 74, sometimes, for example, roads on which the automobile 2 is able to travel are reconstructed more frequently than, for example, public roads. Moreover, such roads are handled in the same way as public roads, and are not included in the high-precision map data 67 in many cases. Furthermore, to the narrow-area high-precision map data 82, data regarding a transition area may be added. The transition area indicates a range of extension of the minute area 74. As illustrated in the figure, for example, when the automobile 2 enters the transition area, the map data to be used in the assistance in the travel of the automobile 2 is switched from the narrow-area high-precision map data 82 to the minute-area map data 83. This makes it possible to expand an area in which the assistance in the travel of the automobile 2 is available. The minute-area map data 83 may be provided by, for example, unillustrated server apparatuses of companies.

It is to be noted that, for example, the minute-area map data 83 may be generated on the basis of the detection data within a range of a predetermined radius detected by the automobile 2 with respect to the current position, or may be generated on the basis of areas (grid) obtained by separating off an aerial photograph or three-dimensional area data by a predetermined distance. The minute-area map data 83 may be generated by combining multiple pieces of the detection data by the automobile 2. Alternatively, the minute-area map data 83 may be generated by combining the multiple pieces of the detection data by the multiple automobiles 2. Alternatively, the minute-area map data 83 may be generated by combining the multiple areas (grid) mentioned above.

The interpolation data 84 is map data that interpolates the narrow-area high-precision map data 82. The narrow-area high-precision map data 82 is generated in corresponding relation to the actual travel environment at a certain point of time. In this case, changes in the travel environment after that point of time are not included in the narrow-area high-precision map data 82. The interpolation data 84 is additional data regarding, for example, a shape of the travel route and the surrounding objects added after the generation of the narrow-area high-precision map data 82. The interpolation data 84 may be data regarding a temporary untravellable site because of, for example, toppled trees or accidents.

The unserviceability setting data 85 is also data regarding, for example, the shape of the travel route and the surrounding objects that have been changed after the generation of the narrow-area high-precision map data 82. However, the unserviceability setting data 85 is data that sets unserviceability of the data regarding, for example, the pre-change shape of the travel route or deleted surrounding objects included in the narrow-area high-precision map data 82.

With the interpolation data 84 and the unserviceability setting data 85, data regarding changes after the generation of the narrow-area high-precision map data 82 is recorded in the server memory 63 of the low-order assistance server apparatus 5.

Moreover, the travel control assistance system 1 includes an interpolation controller 86 in each of the low-order assistance server apparatuses 5 together with the map update server apparatus 8, to update the high-precision map data 67 in each of the assistance server apparatuses 5 and 7. In the figure, a vehicle data recognition unit 87, a low-order assistance unit 88, and a relay controller 89 are illustrated as other configurations of each of the low-order assistance server apparatuses 5. The interpolation controller 86, the vehicle data recognition unit 87, and the low-order assistance unit 88 are implemented in the low-order assistance server apparatus 5 by the server CPU 64 of the low-order assistance server apparatus 5 executing the program held in the server memory 63.

The map update server apparatus 8 is coupled to the assistance server apparatuses 5 and 7 by the server communication unit 61, and updates the high-precision map data 67 held in the assistance server apparatus to which the map update server apparatus 8 is coupled. The map update server apparatus 8 may update the high-precision map data 67 on the basis of, for example, repair work data regarding a road.

The vehicle data recognition unit 87 acquires the actual detection data by the vehicle sensors of the automobile 2 received by the server communication unit 61 through direct communication with the automobile 2, and carries out recognition processing of the surrounding travel route and the surrounding object in the actual travel environment of the automobile 2 on the basis of the detection data. The vehicle data recognition unit 87 generates the recognition data regarding the travel route and the recognition data regarding the surrounding object by the recognition processing, and outputs the generated data to the low-order assistance unit 88.

The low-order assistance unit 88 generates the low-order assistance data to assist in the travel control of the automobile 2, with the use of the recognition data generated by the vehicle data recognition unit 87 together with the detection data by the vehicle sensors of the automobile 2. The low-order assistance unit 88 may transmit the recognition data generated by the vehicle data recognition unit 87 to the automobile 2, as a portion of the low-order assistance data.

Each of the vehicle data recognition unit 87 and the low-order assistance unit 88 may repeatedly carry out its processing at high speeds in synchronization with the control cycles of the travel controller 16 of the automobile 2.

The interpolation controller 86 manages the minute-area map data 83, the interpolation data 84, and the unserviceability setting data 85 held in the server memory 63. The interpolation controller 86 carries out registration update processing in the server memory 63 with respect to the minute-area map data 83, the interpolation data 84, and the unserviceability setting data 85. The update processing of the interpolation controller 86 also includes deletion processing. The interpolation controller 86 may carry out the registration update processing of these pieces of data on the basis of, for example, additional data or an additional operation by the user, or on the basis of the recognition data sequentially generated by the vehicle recognition unit 87.

For example, in a case with a deviant difference between the recognition data generated by the vehicle data recognition unit 87 and the travel environment based on the narrow-area high-precision map data 82, the interpolation controller 86 registers the interpolation data 84 in the server memory 63 on the basis of the recognition data generated. The interpolation data 84 complements the difference between the narrow-area high-precision map data 82 and the actual travel environment. Moreover, in a case where data corresponding to the interpolation data 84 is included in the narrow-area high-precision map data 82, the interpolation controller 86 registers, in the server memory 63, the unserviceability setting data 85 that renders the data unserviceable.

In addition, for example, in a case where the interpolation data 84 and the unserviceability setting data 85 registered in the server memory 63 become unnecessary because of, for example, the update of the narrow-area high-precision map data 82, the interpolation controller 86 deletes the unnecessary data from the server memory 63.

FIG. 6 is a flowchart of an update control of the multiple pieces of the high-precision map data 67 by the map update server apparatus 8 in FIG. 5.

Upon acquiring, for example, the road repair data, the server CPU 64 of the map update server apparatus 8 repeatedly carries out the update control in FIG. 6.

With the use of the acquired data, the server CPU 64 updates, by the update control in FIG. 6, the multiple pieces of the high-precision map data 67 used in the assistance server apparatuses 5 and 7 of the travel control assistance system 1. The multiple pieces of the high-precision map data 67 is updated on the basis of common data.

In step ST11, the server CPU 64 of the map update server apparatus 8 determines whether or not the update of the multiple pieces of the high-precision map data 67 used in the travel control assistance system 1 is necessary. In a case where the server CPU 64 has acquired, for example, the road repair data, the server CPU 64 determines that the update is necessary, and causes the flow to proceed to step ST12. In a case where the update is not necessary, the server CPU 64 ends this control.

In step ST12, the server CPU 64 generates update data regarding the wide-area high-precision map data 81 regarding the widest area used in the travel control assistance system 1. Here, the update data may be basically partial update data such as the road repair data.

In addition, for example, the server CPU 64 may generate, as the update data, the wide-area high-precision map data 81 to which partial data such as the road repair data is applied. In a case where the server CPU 64 acquires the wide-area high-precision map data 81 to which the update data has been already applied, the server CPU 64 may generate the acquired data as the update data.

In step ST13, the server CPU 64 is coupled to the highest-order assistance server apparatus 7 used in the travel control assistance system 1. In FIG. 5, the server CPU 64 is coupled to the high-order assistance server apparatus 7. Thus, the server CPU 64 of the map update server apparatus 8 becomes able to access the server memory 63 of the high-order assistance server apparatus 7.

In step ST14, the server CPU 64 updates the wide-area high-precision map data 81 held in the server memory 63 of the assistance server apparatus to which the server CPU 64 is coupled.

For example, in the server memory 63 of the assistance server apparatus to which the server CPU 64 is coupled, the server CPU 64 may copy the old wide-area high-precision map data 81 that has been already held in the server memory 63, overwrite the copied high-precision map data 67 with the update data to update the high-precision map data 67, and switch the updated high-precision map data 67 to active. The server CPU 64 of the assistance server apparatus assists in the travel control of the automobile 2 with the use of the latest wide-area high-precision map data 81 that has been made active in the server memory 63.

With this update processing, to the updated wide-area high-precision map data 81, for example, a new centerline of the road of the area to be updated and boundary lines of each lane are added.

Moreover, to the updated wide-area high-precision map data 81, for example, a new centerline and boundary lines are added. The new centerline and the boundary lines couple a centerline and boundary lines of a road around the area to be updated to a centerline and boundary lines of a nearby existing road.

Furthermore, to the updated wide-area high-precision map data 81, data regarding surrounding objects recognizable from the automobile 2 while traveling, e.g., road signs, marks, traffic lights, utility poles, and standing trees provided in the area to be updated, is added.

In step ST15, the server CPU 64 acquires the updated wide-area high-precision map data 81 updated in step ST14 from the assistance server apparatus to which the server CPU 64 is coupled.

In step ST16, the server CPU 64 is coupled to the low-order assistance server apparatus 5 used in the travel control assistance system 1. In FIG. 5, the server CPU 64 is coupled to the low-order assistance server apparatus 5. Thus, the server CPU 64 of the map update server apparatus 8 becomes able to access the server memory 63 of the low-order assistance server apparatus 5.

In step ST17, the server CPU 64 updates the narrow-area high-precision map data 82 held in the server memory 63 of the assistance server apparatus to which the server CPU 64 is coupled.

For example, in the server memory 63 of the assistance server apparatus to which the server CPU 64 is coupled, the server CPU 64 may copy the old narrow-area high-precision map data 82 that has been already held in the server memory 63, overwrite the copied high-precision map data 67 with the update data to update the narrow-area high-precision map data 82, and switch the updated high-precision map data 67 to active. The server CPU 64 of the assistance server apparatus assists in the travel control of the automobile 2 with the use of the latest narrow-area high-precision map data 82 that has been made active in the server memory 63.

Here, the server CPU 64 may use the higher-order high-precision map data 67 acquired in step ST15, as the update data. The higher-order high-precision map data 67 acquired in step ST15 already includes the update data regarding, for example, the centerline for the area to be updated and its surroundings.

In addition, in a case where the narrow-area high-precision map data 82 includes, for example, data regarding a more detailed road than the wide-area high-precision map data 81, the server CPU 64 may add, for example, a new centerline of, for example, the detailed road in the area to be updated, and boundary lines of each lane.

In step ST18, the server CPU 64 notifies the interpolation controller 86 of the assistance server apparatus to which the server CPU 64 is coupled, that the narrow-area high-precision map-data 82 has been updated. Thereafter, the server CPU 64 ends this control.

As described, the server CPU 64 of the map update server apparatus 8 is able to update the wide-area high-precision map data 81 out of the narrow-area high-precision map data 82 and the wide-area high-precision map data 81, and afterwards, update the narrow-area high-precision map data 82 with the use of the updated wide-area high-precision map data 81 or equivalent high-precision map data.

It is to be noted that, here, description is given of an example where the travel control assistance system 1 includes the high-order assistance server apparatus 7 and the low-order assistance server apparatuses 5. In a case where the assistance server apparatuses 5 and 7 of the travel control assistance system 1 have a layered structure of three or more layers, the server CPU 64 of the map update server apparatus 8 may repeat the processing described above in order from the highest-order assistance server apparatus to the lowest-order assistance server apparatus 5.

FIG. 7 is a flowchart of a first interpolation control (user map addition control) by the interpolation controller 86 in FIG. 5.

The server CPU 64 of the low-order assistance server apparatus 5, as the interpolation controller 86, may repeatedly carry out the first interpolation control in FIG. 7.

The server CPU 64 carries out the first interpolation control in FIG. 7 to add the minute-area map data 83 to be used in the low-order assistance server apparatus 5.

In step ST21, the server CPU 64 of the low-order assistance server apparatus 5, as the interpolation controller 86, determines presence or absence of any requests for addition of map data. The user generates a request for the addition of map data in an unillustrated client terminal and transmits the generated request to the low-order assistance server apparatus 5. In a case with the presence of a request for the addition of map data, the server CPU 64 of the low-order assistance server apparatus 5 causes the flow to proceed to step ST22. In a case with the absence of a request for the addition of map data, the server CPU 64 ends this control.

In step ST22, the server CPU 64 acquires the minute-area map data 83 to be added to the server memory 63 of the low-order assistance server apparatus 5. The server CPU 64 may acquire the minute-area map data 83 from, for example, the unillustrated client terminal.

In step ST23, the server CPU 64 stores and records the acquired minute-area map data 83 in the server memory 63 of the low-order assistance server apparatus 5.

In step ST24, the server CPU 64 adds data regarding the transition area overlapping with an area for the acquired minute-area map data 83, to the narrow-area high-precision map data 82 held in the server memory 63 of the low-order assistance server apparatus 5. Thus, the data regarding the transition area for the narrow-area high-precision map data 82 is replaced with the data regarding the minute-area map data 83, and is used to assist in the travel control of the automobile 2. Thereafter, the server CPU 64 ends this control.

Thus, the interpolation controller 86 is able to record the minute-area map data 83 corresponding to a portion of the narrow-area high-precision map data 82, in the server memory 63 separately from the narrow-area high-precision map data 82.

Thereafter, the low-order assistance unit 88 generates low-order assistance data that assists in the travel control of the automobile 2, with the preferential use of the minute-area map data 83 to the narrow-area high-precision map data 82.

FIG. 8 is a flowchart of a second interpolation control (sequential interpolation control) by the interpolation controller 86 in FIG. 5.

The server CPU 64 of the low-order assistance server apparatus 5, as the interpolation controller 86, may repeatedly carry out the second interpolation control in FIG. 8.

The server CPU 64 carries out the second interpolation control in FIG. 8 to add, as the interpolation data 84, data regarding, for example, surrounding objects present in the actual environment that is not included in the narrow-area high-precision map data 82 used in the low-order assistance server apparatus 5.

Moreover, the server CPU 64 carries out the second interpolation control in FIG. 8 to add the unserviceability setting data 85 that renders unserviceable data regarding, for example, surrounding objects that are not present in the actual environment but included in the narrow-area high-precision map data 82 used in the low-order assistance server apparatus 5.

Furthermore, the server CPU 64, as the interpolation controller 86, may acquire, from the vehicle data recognition unit 87, the recognition data regarding the travel route and the recognition data regarding the surrounding objects generated to assist in the travel control in the low-order assistance server apparatus 5.

In step ST31, the server CPU 64 of the low-order assistance server apparatus 5, as the interpolation controller 86, determines whether or not new unprocessed recognition data has been acquired from the vehicle data recognition unit 87. In a case with the unprocessed recognition data, the server CPU 64 causes the flow to proceed to step ST32. In a case without the unprocessed recognition data, the server CPU 64 ends this control.

In step ST32, the server CPU 64 acquires, from the narrow-area high-precision map data 82 held in the server memory 63 of the low-order assistance server apparatus 5, data regarding a surrounding area with respect to the unprocessed recognition data. For example, on the basis of the position of the automobile 2 corresponding to the unprocessed recognition data, the server CPU 64 may acquire the data regarding the surrounding area around the position of the automobile 2. The data regarding the surrounding area includes, for example, a new centerline of a road in the area, and boundary lines of each lane. Moreover, the data regarding the surrounding area includes data regarding surrounding objects recognizable from the automobile 2 while traveling, e.g., road signs, marks, traffic signals, utility poles, and standing trees provided in the area.

In step ST33, the server CPU 64 determines whether or not data that matches, for example, the surrounding object related to the recognition data in terms of their positions is included in the data acquired in step ST32. Moreover, for example, the server CPU 64 may determine whether or not the centerline included in the data acquired in step ST32 matches the centerline related to the recognition data. Here, the server CPU 64 may determine whether or not the positions match, on the basis of whether or not an amount of a difference between the two positions to be compared is equal to or smaller than a threshold value by which it is determined that the positions match.

Thus, in a case where the data that matches, for example, the surrounding object related to the recognition data is not included in the data acquired in step ST32, the server CPU 64 determines absence of the matching data, and causes the flow to proceed to step ST34. In a case where the matching data is included, the server CPU 64 determines presence of the matching data, and ends this control.

In step ST34, the server CPU 64 generates the interpolation data 84 based on the recognition data with no matching data included in the data acquired in step ST32, and records the interpolation data 84 in the server memory 63. The interpolation data 84 may include, for example, data regarding the position and the kind of the surrounding object to be added.

In step ST35, the server CPU 64 determines presence or absence of corresponding data that deviates from the recognition data, in the data acquired in step ST32. For example, utility poles are sometimes relocated during, for example, road repair. With respect to a similar kind of data to the recognition data that is included in the data acquired in step ST32, the server CPU 64 may determine a degree of deviation with respect to, for example, their positions. Here, the server CPU 64 may determine the presence of the corresponding data in a case where an amount of a difference between the two positions to be compared is equal to or smaller than a threshold value by which it is determined that the two positions are different.

Moreover, in a case where the corresponding data to the recognition data is not included in the data acquired in step ST32, the server CPU 64 determines the absence of the corresponding data, and ends this control. In a case with the presence of the corresponding data, the server CPU 64 determines the presence of the corresponding data, and causes the flow to proceed to step ST36.

In step ST36, the server CPU 64 generates the unserviceability setting data 85 regarding the corresponding data included in the narrow-area high-precision map data 82 held in the server memory 63 of the low-order assistance server apparatus 5, and records the unserviceability setting data 85 in the server memory 63. The unserviceability setting data 85 may include, for example, data regarding the position and the kind of the surrounding object to be made unserviceable. Thereafter, the server CPU 64 ends this control.

FIG. 9 is a flowchart of a third interpolation control (deletion control of, for example, the interpolation data 84) by the interpolation controller 86 in FIG. 5.

The server CPU 64 of the low-order assistance server apparatus 5, as the interpolation controller 86, may repeatedly carry out the third interpolation control in FIG. 9.

The server CPU 64 carries out the third interpolation control in FIG. 9 to delete the unnecessary interpolation data 84 and the unnecessary unserviceability setting data 85 from the server memory 63 of the low-order assistance server apparatus 5.

Moreover, the server CPU 64 may carry out the third interpolation control in FIG. 9 to delete the minute-area map data 83 to be used in the low-order assistance server apparatus 5 from the server memory 63 of the low-order assistance server apparatus 5.

Furthermore, the server CPU 64 as the interpolation controller 86 may carry out the third interpolation control in FIG. 9 in a case the server CPU 64 acquires, from the map update server apparatus 8, an update notification with respect to the narrow-area high-precision map data 82 to be used in the low-order assistance server apparatus 5.

In step ST41, the server CPU 64 of the low-order assistance server apparatus 5, as the interpolation controller 86, selects, for example, the interpolation data 84 held in the server memory 63.

In step ST42, the server CPU 64 acquires, from the narrow-area high-precision map data 82, data regarding a surrounding area around the position related to, for example, the interpolation data 84 held in the server memory 63. The data regarding the surrounding area includes, for example, a new centerline of a road in the area, and boundary lines of each lane. Moreover, the data regarding the surrounding area includes data regarding surrounding objects recognizable from the automobile 2 while traveling, e.g., road signs, marks, traffic signals, utility poles, and standing trees provided in the area.

In step ST43, the server CPU 64 compares the data in step ST41 with the data in step ST42, and determines presence or absence of undeviated corresponding data from, for example, the surrounding object targeted by, for example, the interpolation data 84. For example, utility poles are sometimes relocated during, for example, road repair. With respect to a similar kind of data to the data regarding the surrounding object included in the data acquired in step ST41, the server CPU 64 may determine a degree of deviation inclusive of, for example, a degree of deviation between their positions. Here, for example, the server CPU 64 may determine the presence of the undeviated corresponding data in a case where an amount of a difference between the two positions to be compared is equal to or smaller than a threshold value by which it is determined that the two positions are different.

Moreover, in a case where the data corresponding to the interpolation data 84 is included in the data acquired in step ST42, the server CPU 64 determines the presence of the undeviated corresponding data, and causes the flow to proceed to step ST44. In a case where the data is not included, the server CPU 64 determines the absence of the undeviated corresponding data, and cause the flow to proceed to step ST45.

In step ST44, the server CPU 64 deletes, for example, the selected interpolation data 84 from the server memory 63.

In step ST45, the server CPU 64 determines whether or not to end this control. In a case where the server CPU 64 has not finished carrying out this control for all the pieces of data held in the server memory 63, the server CPU 64 causes the flow to return to step ST41. The server CPU 64 selects the next piece of, for example, the interpolation data 84, and carries out the processing of steps ST41 to ST45. In a case where the server CPU 64 has finished this control for all the pieces of data, the server CPU 64 determines that this control is to be ended, and ends this control.

Thus, in a case where, for example, the narrow-area high-precision map data 82 is updated by the map update server apparatus 8, the server CPU 64 of the low-order assistance server apparatus 5 is able to compare the interpolation data 84 generated and held in the server memory 63 with the updated narrow-area high-precision map data 82.

Moreover, in a case where the data corresponding to the interpolation data 84 is included in the updated narrow-area high-precision map data 82, the server CPU 64 is able to delete the interpolation data 84 from the server memory 63.

Next, description is given of a control of assisting in the travel control of the automobile 2 in the travel control assistance system 1 having the map data update function as mentioned above.

In the travel control assistance system 1, the server CPU 64 of the high-order assistance server apparatus 7 and the server CPU 64 of the low-order assistance server apparatus 5 basically generate the data that assists in the travel control of the automobile 2, with the use of the high-precision map data 67 held in their respective server memories 63 and the detection data by the vehicle sensors of the automobile 2, and provide the automobile 2 with the generated data. The high-order assistance server apparatus 7 and the low-order assistance server apparatus 5 may provide the automobile 2 with different kinds of the assistance data.

For example, the low-order assistance server apparatus 5 may generate the low-order assistance data on the basis of, for example, the recognition data regarding the actual travel environment of the automobile 2, and provide the automobile 2 with the generated low-order assistance data. The low-order assistance data includes, for example, the control value to be used by the travel controller 16 of the automobile 2 on the short control cycles.

In contrast, the high-order assistance server apparatus 7 may generate, on the basis of the travel environment of the automobile 2 in the wide-area high-precision map data 81, the high-order assistance data regarding, for example, the direction of long-term travel of the automobile 2, and provide the automobile 2 with the high-order assistance data through the low-order assistance server apparatus 5.

FIG. 10 is a flowchart of a low-order assistance control in consideration of the map update, by the low-order assistance server apparatus 5 in FIG. 5.

The server CPU 64 of the low-order assistance server apparatus 5, as the low-order assistance unit 88, may repeatedly carry out the low-order assistance control in FIG. 10 upon acquiring the detection data by the vehicle sensors from the automobile 2.

The server CPU 64 may repeatedly carry out the low-order assistance control in FIG. 10 on the short control cycles of the travel controller 16 of the automobile 2.

In step ST51, the server CPU 64 of the low-order assistance server apparatus 5, as the low-order assistance unit 88, determines whether or not the new detection data by the vehicle sensors has been received and acquired from the automobile 2. In a case where no new detection data by the vehicle sensors has been acquired, the server CPU 64 repeats this process. Upon acquiring the new detection data by the vehicle sensors, the server CPU 64 causes the flow to proceed to step ST52.

In step ST52, the server CPU 64 assumes the detected position of the automobile 2 included in the acquired detection data to be the vehicle position, and determines whether or not the vehicle position is in the transition area set for the narrow-area high-precision map data 67. In a case where the vehicle position is not in the transition area, the server CPU 64 causes the flow to proceed to step ST53. In a case where the vehicle position is in the transition area, the server CPU 64 causes the flow to proceed to step ST54.

In step ST53, the server CPU 64 generates the space data regarding the surroundings of the vehicle position on the basis of the active narrow-area high-precision map data 67 held in the server memory 63. In the space data regarding the surroundings of the vehicle position, the travel route along which the automobile 2 is traveling and the surrounding objects along the travel route included in the narrow-area high-precision map data 67 are laid out and arranged on the basis of their respective pieces of positional data. Thereafter, the server CPU 64 causes the flow to proceed to step ST55.

In step ST54, the server CPU 64 generates the space data regarding the surroundings of the vehicle position on the basis of the minute-area map data 83 held in the server memory 63. In the space data regarding the surroundings of the vehicle position, the travel route along which the automobile 2 is traveling and the surrounding objects along the travel route included in the minute-area map data 83 are laid out and arranged on the basis of their respective pieces of the positional data. Thereafter, the server CPU 64 causes the flow to proceed to step ST55.

In step ST55, the server CPU 64 determines whether or not, for example, the surrounding object that has been rendered unserviceable by the unserviceability setting data 85 is included in the generated space data regarding the surroundings. In a case where, for example, the unserviceable surrounding object is included, the server CPU 64 causes the flow to proceed to step ST56. In a case where, for example, no unserviceable surrounding object is included, the server CPU 64 causes the flow to proceed to step ST57.

In step ST56, the server CPU 64 deletes, for example, the surrounding object corresponding to the unserviceability setting data 85 from the generated space data regarding the surroundings, and corrects the space data regarding the surroundings. Thereafter, the server CPU 64 causes the flow to proceed to step ST57.

In step ST57, the server CPU 64 determines whether or not the interpolation data 84 is included in the generated space data regarding the surroundings. In a case where the interpolation data 84 is included, the server CPU 64 causes the flow to proceed to step ST58. In a case where the interpolation data 84 is not included, the server CPU 64 causes the flow to proceed to step ST59.

In step ST58, the server CPU 64 adds, for example, the surrounding object corresponding to the interpolation data 84 to the generated space data regarding the surroundings, and corrects the space data regarding the surroundings. Thereafter, the server CPU 64 causes the flow to proceed to step ST59.

In step ST59, the low-order assistance data that assists in the travel control of the automobile 2 is generated on the basis of the space data regarding the surroundings corrected as necessary by the series of processes described above. The low-order assistance data may generate, for example, the control value that allows for the safe travel in the space data regarding the surroundings corrected as necessary. The server CPU 64 directly transmits the generated low-order assistance data from the server communication unit 61 to the automobile 2 from which the detection data has been acquired.

As described, the server CPU 64 of the low-order assistance server apparatus 5, as the low-order assistance unit 88, generates the low-order assistance data that assists in the travel control of the automobile 2, with the preferential use of the interpolation data 84 to the narrow-area high-precision map data 82.

Moreover, in the case where the corresponding data to the interpolation data 84 is included in the narrow-area high-precision map data 82, the server CPU 64 generates the low-order assistance data that assists in the travel control of the automobile 2, with the use of the interpolation data 84 instead of the corresponding data to the narrow-area high-precision map data 82.

Furthermore, because the low-order assistance server apparatus 5 is coupled to the base station 3, it is possible to repeatedly provide the travel controller 16 of the automobile 2 with the low-order assistance data, to obtain high responsiveness suitably corresponding to the control cycles of the travel controller 16 of the automobile 2.

FIG. 11 is a flowchart of a high-order assistance control in consideration of the map update, by the high-order assistance server apparatus 7 in FIG. 5.

Upon acquiring the detection data by the automobile 2 through the low-order assistance server apparatus 5, the server CPU 64 of the high-order assistance server apparatus 7 may repeatedly carry out the high-order assistance control in FIG. 11. The detection data by the automobile 2 to be acquired by the high-order assistance server apparatus 7 may include the secondary detection data such as the recognition data generated by the low-order assistance server apparatus 5, together with the primary detection data detected by the vehicle sensors of the automobile 2.

The server CPU 64 may repeatedly carry out the high-order assistance control in FIG. 11 on longer cycles than the short control cycles of the travel controller 16 of the automobile 2, regardless of the short control cycles of the travel controller 16 of the automobile 2.

In step ST61, the server CPU 64 of the high-order assistance server apparatus 7 collects the new detection data received from the multiple automobiles 2 through the low-order assistance server apparatus 5. The detection data collected for each of the automobiles 2 includes, at least, data regarding the vehicle position detected by the vehicle sensors of the automobile 2. The detection data collected for each of the automobiles 2 may further include data regarding, for example, a travel speed, a direction of travel, and vehicle behavior.

In step ST62, the server CPU 64 maps the multiple automobiles 2 onto a wide-area travel route map based on the active wide-area high-precision map data 67 held in the server memory 63. In the wide-area travel route map, the multiple automobiles 2 are mapped in an arrangement corresponding to the actual travel environment. Here, the travel route map may include multiple diagrams for each road or for each lane. In this case, each of the automobiles 2 is mapped onto the diagram corresponding to the road or the lane on which it is actually traveling. In the diagram, it is possible to express, for example, an inter-vehicle distance and a speed difference between the preceding automobile 2 and the following automobile 2.

In step ST63, the server CPU 64 generates the high-order assistance data that assists in the traveling of each of the multiple automobiles 2. As the high-order assistance data for each of the automobiles 2, the server CPU 64 may generate data regarding the remote control about a route for the safe or efficient travel of each of the automobiles 2, and data regarding the traffic control about, for example, a travelable range for the safe travel of each of the automobile 2, in the travel environment of each of the automobiles 2 in the wide-range travel route map. The high-order assistance data may include route instruction data regarding, for example, a lane change, diverging and merging, and a right turn and a left turn. Such high-order assistance data is different data from the low-order assistance data mentioned above. Moreover, because the high-order assistance data is basically data regarding a longer period of time than the control cycle, the high-order assistance data is data regarding a longer distance than the travel distance assisted by the low-order assistance data.

In step ST64, the server CPU 64 transmits, to the multiple low-order assistance server apparatuses 5 corresponding to the respective automobiles 2, the high-order assistance data generated to assist in the travel control for each of the multiple automobiles 2.

FIG. 12 is a flowchart of a relay control in consideration of the map update, by the low-order assistance server apparatus 5 in FIG. 5.

The server CPU 64 of the low-order assistance server apparatus 5, as the relay controller 89, may repeatedly carry out the relay control in FIG. 12.

The relay controller 89 is implemented in the low-order assistance server apparatus 5 as illustrated in FIG. 5 by the server CPU 64 of the low-order assistance server apparatus 5 executing a program.

The server CPU 64 as the relay controller 89 repeatedly receives and acquires the high-order assistance data for each of the automobiles 2 from the high-order assistance server apparatus 7, and transmits the acquired high-order assistance data to the corresponding automobile 2.

In step ST71, the server CPU 64 of the low-order assistance server apparatus 5, as the relay controller 89, determines whether or not unprocessed high-order assistance data has been received from the high-order assistance server apparatus 7. In a case where no unprocessed high-order assistance data has been received, the server CPU 64 repeats this process. Upon receiving the unprocessed high-order assistance data, the server CPU 64 causes the flow to proceed to step ST72.

In step ST72, the server CPU 64 acquires the latest space data in the low-order assistance server apparatus 5. The server CPU 64 may acquire the latest space data by generating the latest space data in the low-order assistance server apparatus 5 with the use of, for example, the narrow-area high-precision map data 82 and the interpolation data 84 held in the server memory 63 of the low-order assistance server apparatus 5. In addition, for example, the server CPU 64 may acquire the latest space data generated in the low-order assistance control in FIG. 10.

In step ST73, the server CPU 64 maps the travel route based on the high-order assistance data onto the space data in the low-order assistance server apparatus 5 acquired in step ST72. Here, the travel route may be a travelable range in which the automobile 2 may travel by the travel control.

In step ST74, the server CPU 64 determines, on the basis of the data generated by the mapping, whether or not the travel route is travelable in accordance with the high-order assistance data. In a case where the travel route is safely travelable in accordance with the high-order assistance data without causing, for example, interference in the space data in the low-order assistance server apparatus 5, the server CPU 64 assumes that the travel route is evaluated as being OK and causes the flow to proceed to step ST75. In a case where the travel route is not evaluated as being safely travelable, the server CPU 64 causes the flow to proceed to step ST76.

In step ST75, the server CPU 64 transmits, to the automobile 2, the high-order assistance data that is evaluated as being OK. Thus, the high-order assistance data generated by the high-order assistance server apparatus 7 for each of the automobiles 2 is transmitted to the relevant automobile 2 through the low-order assistance server apparatus 5. Thereafter, the server CPU 64 ends this control.

In step ST76, the server CPU 64 determines whether or not the high-order assistance data that is not evaluated as being OK is adjustable. For example, in a case where only a portion of the high-order assistance data regarding the travelable range overlaps with and interferes with the surrounding object present in the space data in the low-order assistance server apparatus 5, the server CPU 64 determines that the high-order assistance data is adjustable, and causes the flow to proceed to step ST77. In a case where the server CPU 64 is not able to determine that the high-order assistance data is adjustable, the server CPU 64 causes the flow to proceed to step ST78.

In step ST77, the server CPU 64 adjusts the adjustable high-order assistance data. The server CPU 64 generates the high-order assistance data in which the travelable range in the high-order assistance data is narrowed down to a range that does not overlap with the surrounding object. Thereafter, in step ST75, the server CPU 64 transmits the adjusted high-order assistance data to the automobile 2. Thus, the high-order assistance data generated by the high-order assistance server apparatus 7 for each of the automobiles 2 is adjusted in the low-order assistance server apparatus 5, and the resultant high-order assistance data is transmitted to the automobile 2. Thereafter, the server CPU 64 ends this control.

In step ST78, the server CPU 64 stops relay transmission to the automobile 2 of the high-order assistance data that is not evaluated as being OK and is unadjustable.

In step ST79, the server CPU 64 transmits, to the high-order assistance server apparatus 7, the fact that the high-order assistance data has not been relayed. Thereafter, the server CPU 64 ends this control.

As described, the server CPU 64 of the low-order assistance server apparatus 5, as the relay controller 89, is able to control the relay transmission to the automobile 2 of the high-order assistance data received from the high-order assistance server apparatus 7.

The server CPU 64 is able to make the evaluation of the high-order assistance data by, for example, the narrow-area high-precision map data 82 and the interpolation data 84 used in the low-order assistance server apparatus 5. The server CPU 64 is able to perform the relay transmission of the high-order assistance data as it is to the automobile 2 solely in the case where the evaluation is favorable.

In the case where the evaluation is not favorable, the server CPU 64 is able to refrain from the relay transmission of the high-order assistance data to the automobile 2, or adjust the high-order assistance data and perform the relay transmission of the resultant high-order assistance data to the automobile 2.

FIG. 13 is a flowchart of the travel control of the automobile 2 adapted for the travel control assistance system 1 in FIG. 2.

The vehicle ECU 32 of the travel controller 16 of the automobile 2 repeatedly carries out the travel control in FIG. 13 to use the data by the assistance server apparatuses 5 and 7 of the travel control assistance system 1 for the travel control.

The travel controller 16 may repeatedly carry out the travel control in FIG. 13 on every control cycle of the automobile 2.

In step ST1, the travel controller 16 determines whether or not the detection data by the vehicle sensors is acquired from the vehicle sensor unit 15.

In step ST2, the travel controller 16 determines whether or not to use the assistance by the assistance server apparatuses 5 and 7 of the travel control assistance system 1. For example, the travel controller 16 may determine whether or not the assistance by the assistance server apparatuses 5 and 7 is available, on the basis of the current position of the vehicle. Moreover, for example, the travel controller 16 may determine whether or not the assistance is necessary, on the basis of whether or not execution of the high-load control such as the automated driving of the level 3 or higher, e.g., L3 or L4, is requested by the driver, or in accordance with a state such as the remaining power of the battery of the vehicle. Furthermore, in a case where the assistance by the assistance server apparatuses 5 and 7 is available and the vehicle is going to use the assistance, the travel controller 16 causes the flow to proceed to step ST3 to receive the assistance in, for example, the high-load automated driving of the level 3 or higher. Otherwise, the travel controller 16 causes the flow to proceed to step ST6 to carry out the autonomously completed control.

In step ST3, the travel controller 16 transmits the detection data by the vehicle sensors acquired from the vehicle sensor unit 15, to the low-order assistance server apparatus 5. The vehicle communication unit 17 of the automobile 2 establishes the communication path through SSL/TLS-VPN coupling with the server communication unit 61 of the assistance server apparatus, encrypts the packet including the detection data by the vehicle sensors, and transmits the encrypted packet to the vehicle communication unit 17. The vehicle communication unit 17 transmits the packet to the low-order assistance server apparatus 5 by wireless communication through the base station 3. The low-order assistance server apparatus 5 carries out the various controls described above, and promptly transmits the low-order assistance data to the vehicle communication unit 17. Moreover, the low-order assistance server apparatus 5 transmits the high-order assistance data received from the high-order assistance server apparatus 7, to the vehicle communication unit 17. Thus, the vehicle communication unit 17 of the automobile 2 is able to receive the assistance data by the low-order assistance server apparatuses 5.

In step ST4, the travel controller 16 determines whether or not various kinds of the assistance data have been acquired from the low-order assistance server apparatus 5. In a case where the vehicle communication unit 17 has not received the assistance data, the travel controller 16 determines that the assistance data has not been acquired, and repeats this process. Upon the vehicle communication unit 17 receiving the assistance data, the travel controller 16 determines that the assistance data has been acquired, and causes the flow to proceed to step ST5.

In step ST5, the travel controller 16 acquires the various kinds of the assistance data received by the vehicle communication unit 17 from the low-order assistance server apparatus 5, and carries out the travel control of the automobile 2 on the basis of the various kinds of the assistance data and the detection data by the vehicle sensors.

In a case where the control value is included in the assistance data, the travel controller 16 may control the travel in accordance with the control value. In a case where, for example, the data regarding the travelable range by, for example, the traffic control is included in the assistance data, the traveling controller 16 may generate the control value that allows for the travel within the range, and control the travel by the generated control value.

Moreover, on such travel, the travel controller 16 may adjust the control value to allow the vehicle to travel to keep to the travel route while traveling on the basis of the detection data by the vehicle sensors, or allow the vehicle to travel not to interfere with surrounding objects recognized on the basis of the detection data by the vehicle sensors.

Thus, for example, it is possible for the automobile 2 to travel while basically keeping to the travel route in accordance with the traffic control or the remote control by the travel control assistance system 1, and not to interfere with the surrounding objects.

Thereafter, the travel controller 16 causes the flow to proceed to step ST8.

In step ST6, to carry out the autonomously completed control, the travel controller 16 generates, in the vehicle, the secondary detection data to be involved in the high-load control of the level 3 or higher. For example, the travel controller 16 may generate the secondary detection data on the basis of the space data regarding the surroundings of the vehicle. The secondary detection data may include the recognition data regarding lane lines of the travel route along which the vehicle is traveling, and the recognition data regarding surrounding objects such as other moving bodies around the vehicle. The travel controller 16 may use AI processing by machine learning in extraction processing of objects from the space data and recognition processing of the extracted objects.

In step ST7, the travel controller 16 carries out the travel control of the automobile 2 on the basis of the detection data by the vehicle sensors. Here, the detection data by the vehicle sensors includes the secondary detection data generated in step ST6.

The travel controller 16 may generate the control value that allows the vehicle to keep to the travel route while traveling, on the basis of the detection data by the vehicle, or generate the control value that allows the vehicle to travel not to interfere with the surrounding objects. Moreover, the travel controller 16 controls the travel in accordance with the generated control value.

Thus, it is possible for the automobile 2 to travel by the autonomous control by the vehicle, while basically keeping to the travel route, and not to interfere with the surrounding objects. Thereafter, the travel controller 16 causes the flow to proceed to step ST8.

In step ST8, the travel controller 16 determines whether or not to end the travel control of the automobile 2. The travel controller 16 may determine that the travel control of the automobile 2 is to be ended, on the basis of, for example, whether or not the automobile 2 has arrived at a destination and stopped. In a case where the travel controller 16 does not determine that the travel control of the automobile 2 is to be ended, the travel controller 16 causes the flow to return to step ST1. The travel controller 16 repeats the processes of steps ST1 to ST8 until the travel controller 16 determines that the travel control of the automobile 2 is to be ended, and continues the travel control of the automobile 2. In a case where the travel controller 16 determines that the travel control of the automobile 2 is to be ended, the travel controller 16 ends this control.

FIG. 14 is a diagram that illustrates a flow of an example of the map update in the travel control assistance system 1 of this embodiment.

FIG. 14 illustrates the narrow-area high-precision map data 82, the interpolation data 84 regarding impassability, and the unserviceability setting data 85 that renders a utility pole inoperable, held in the server memory 63 of the low-order assistance server apparatus 5.

Moreover, in FIG. 14, time flows from top to bottom. In the figure, the timing T1 to T4 is illustrated. Moreover, as for the timing T1 to T3, diagrams illustrating the actual travel environment are provided. In the travel environment at each timing, the automobile 2 and a utility pole are illustrated. The automobile 2 is traveling along the travel route such as a road. The utility pole is located ahead in the direction of travel of the automobile 2.

At the first timing T1, an accident occurs in which the automobile 2 collides with a utility pole 91 erected on the road shoulder. As a result, the utility pole 91 topples down to the travel route along which the automobile 2 is traveling, as illustrated at the second timing T2.

At the second timed T2 after the accident, another automobile 2 different from the automobile that has been involved in the accident is traveling toward the place where the utility pole 92 has toppled down. The automobile 2 detects the space data regarding the surroundings including data regarding the utility pole 92 that has topped down to the travel route, by the stereo camera 23, the Lidar 24, or the omnidirectional camera 25.

Thus, the vehicle data recognition unit 87 of the low-order assistance server apparatus 5 generates the recognition data regarding the toppled utility pole 92 recognized on the basis of the detection data acquired from the automobile 2.

On the basis of the recognition data, the interpolation controller 86 of the low-order assistance server apparatus 5 generates the interpolation data 84, and records the interpolation data 84 in the server memory 63. The interpolation data 84 includes positional data and range data regarding a position or a range where the toppled utility pole 92 hinders the traffic.

Moreover, the interpolation controller 86 of the low-order assistance server apparatus 5 may generate the unserviceability setting data 85 regarding data regarding the utility pole 91 before toppling down, and record the unserviceability setting data 85 in the server memory 63.

Thereafter, the low-order assistance unit 88 and the relay controller 89 of the low-order assistance server apparatus 5 generate and/or verify the assistance data with the use of the interpolation data 84 and the unserviceability setting data 85 together with the narrow-area high-precision map data 82 held in the server memory 63.

At the third timing T3, the toppled utility pole is restored. The utility pole manager removes and restores the toppled utility pole 92 in response to, for example, a notification of the accident. It is to be noted that the utility pole after the restoration may be restored at the same position (93) as the original one, or may be relocated and restored at a position (94) slightly shifted from the original position before the restoration, as indicated by broken lines in the figure.

With such restoration, the toppled utility pole 92 before the restoration is no longer recognized by the vehicle data recognition unit 87 of the low-order assistance server apparatus 5 on the basis of the detection data by the automobile 2.

Instead, the utility pole 93 restored at the original position is recognized by the vehicle data recognition unit 87 of the low-order assistance server apparatus 5 on the basis of the detection data by the automobile 2.

The interpolation controller 86 of the low-order assistance server apparatus 5 deletes the interpolation data 84 and the unserviceability setting data 85 regarding the toppled utility pole 92 from the server memory 63 on the basis of the fact that the recognition data regarding the toppled utility pole 92 is no longer detected.

However, in a case where the utility pole 94 after the restoration is restored at the position shifted from the original position of the toppled utility pole as denoted by the broken lines in the figure, the interpolation controller 86 of the low-order assistance server apparatus 5 deletes the interpolation data 84 and the unserviceability setting data 85 regarding the toppled utility pole 92 from the server memory 63, on the basis of the fact that the recognition data regarding the toppled utility pole 92 is no longer detected. Moreover, the interpolation controller 86 of the low-order assistance server apparatus 5 records the interpolation data 84 and the unserviceability setting data 85 regarding the relocated utility pole 94 after the restoration in the server memory 63. The interpolation data 84 and the unserviceability setting data 85 held in the server memory 63 are updated to those regarding the relocated utility pole. As a result, for example, the interpolation data 84 regarding the utility pole is not deleted from the server memory 63.

Thereafter, at the third timing T4, the map update server apparatus 8 updates the narrow-area high-precision map data 82 held in the server memory 63 of the low-order assistance server apparatus 5. This update includes the data regarding the utility pole 94 restored at the third timing T3.

On the basis of a notification that the narrow-area high-precision map data 82 of the low-order assistance server apparatus 5 has been updated, the interpolation controller 86 of the low-order assistance server apparatus 5 deletes, for example, the interpolation data 84 that has become redundant with the data in the narrow-area high-precision map data 82, from the server memory 63.

At this occasion, the interpolation controller 86 of the low-order assistance server apparatus 5 may determine that the interpolation data 84 is redundant, after confirming that the updated narrow-area high-precision map data 82 includes undeviant data from, for example, the interpolation data 84.

As described, on the basis of the detection data regarding the actual surroundings by the multiple automobiles 2 traveling along the travel route, a set of the map data 82 to 85 held in the server memory 63 of the low-order assistance server apparatus 5 continue to be updated not to deviate from the reality. It is possible for the set of the map data 82 to 85 to provide high-precision map data corresponding promptly to the changes in the situation of the actual travel route.

As described, in this embodiment, the travel control assistance system 1 for the automobile 2 includes the map update server apparatus 8, together with the assistance server apparatuses 5 and 7. The assistance server apparatuses 5 and 7 generate the data that assists in the travel control of the automobile 2 on the basis of the respective pieces of the high-precision map data 67 and transmit the data to the automobile 2. The map update server apparatus 8 updates the multiple pieces of the high-precision map data 67 held in the assistance server apparatuses 5 and 7. Moreover, the multiple pieces of the high-precision map data 67 held in the assistance server apparatuses 5 and 7 include the narrow-area high-precision map data 82 and the wide-area high-precision map data 81. The narrow-area high-precision map data 82 is held in the low-order assistance server apparatus 5. The wide-area high-precision map data 81 includes the narrow-area high-precision map data 82 and is held in the high-order assistance server apparatus 7.

Furthermore, in this embodiment, the map update server apparatus 8 updates the narrow-area high-precision map data 82 and the wide-area high-precision map data 81 on the basis of the common data. In particular, in this embodiment, the map update server apparatus 8 updates the wide-area high-precision map data 81 out of the narrow-area high-precision map data 82 and the wide-area high-precision map data 81, and afterwards, updates the narrow-area high-precision map data 82 with the use of the updated wide-area high-precision map data 81 or the equivalent high-precision map data. Thus, the updated narrow-area high-precision map data 82 held in the low-order assistance server apparatus 5 and the updated wide-area high-precision map data 81 held in the high-order assistance server apparatus 7 are updated to ensure or maintain a certain degree of consistency between them.

In contrast, there is possibility that, for example, the map update server apparatus 8 updates the narrow-area high-precision map data 82 out of the narrow-area high-precision map data 82 and the wide-area high-precision map data 81, and afterwards, updates the wide-area high-precision map data 81 with the use of the updated narrow-area high-precision map data 82. However, the narrow-area high-precision map data 82 generally includes finer data than the wide-area high-precision map data 81. Accordingly, in the case where the high-precision map data 67 is updated in order from the narrow-area high-precision map data as mentioned above, it may be possibly difficult to uniquely identify a portion of the wide-area high-precision map data 81 corresponding to the updated portion of the updated narrow-area high-precision map data 82. In this embodiment, it is possible to optimally update the multiple pieces of the high-precision map data 67 not to cause such a consistency problem.

Moreover, because the certain degree of consistency is ensured among the multiple pieces of the high-precision map data 67, the assistance server apparatuses 5 and 7 of the travel control assistance system 1 of this embodiment are able to generate the multiple pieces of the assistance data having the certain degree of consistency among them, and transmit the generated assistance data to each of the automobiles 2. On the assumption that the certain degree of consistency is ensured among the multiple pieces of the assistance data acquired from the assistance server apparatuses 5 and 7, the automobiles 2 are able to carry out the travel control with the use of the multiple pieces of the acquired assistance data.

As described, in this embodiment, it is possible to improve the travel control assistance system 1 for the automobile 2 having the map update function.

In this embodiment, the low-order assistance server apparatus 5 includes the server communication unit 61, the vehicle data recognition unit 87, the interpolation controller 86, and the low-order assistance unit 88. The server communication unit 61 receives the actual detection data by the vehicle sensors of the automobile 2 by the direct communication with the automobile 2. On the basis of the detection data by the automobile 2 received by the server communication unit 61 by the direct communication, the vehicle data recognition unit 87 generates the recognition data corresponding to the actual travel environment of the automobile 2, to assist in the travel control of the automobile 2. In the case with the deviant difference between the generated recognition data and the travel environment based on the narrow-area high-precision map data 82, the interpolation controller 86 generates the interpolation data 84 on the basis of the recognition data generated to complement the deviation. The interpolation data 84 complements the difference between the narrow-area high-precision map data 82 and the actual travel environment. The low-order assistance unit 88 assists in the travel control of the automobile 2. Moreover, the low-order assistance unit 88 generates the low-order assistance data that assists in the travel control of the automobile 2, with the preferential use of the interpolation data 84 to the narrow-area high-precision map data 82.

Thus, the low-order assistance data generated by the low-order assistance unit 88 to assist in the travel control of the automobile 2 is able to correspond to the actual travel environment to be detected by the vehicle sensors of the automobile 2 even in a case where the narrow-area high-precision map data 82 is not updated to correspond to the actual travel environment. For example, in a case with a change in the travel environment in reality, even when a change corresponding thereto has not yet been made by the map update server apparatus 8, the low-order assistance unit 88 is able to generate the low-order assistance data corresponding to the actual travel environment. In addition, it is desirable that the narrow-area high-precision map data 82 and the wide-area high-precision map data 81 be basically updated simultaneously. But even in a situation where, for example, only the wide-area high-precision map data 81 out of the narrow-area high-precision map data 82 and the wide-area high-precision map data 81 is updated, the low-order assistance unit 88 is able to generate the low-order assistance data corresponding to the actual traveling environment. It is unnecessary to simultaneously update the narrow-area high-precision map data 82 and the wide-area high-precision map data 81.

Moreover, in generating the interpolation data 84, in the case where the data corresponding to the interpolation data 84 is included in the narrow-area high-precision map data 82, the low-order assistance unit 88 of this embodiment generates the low-order assistance data that assists in the travel control of the automobile 2, with the use of the interpolation data 84 instead of the corresponding data to the narrow-area high-precision map data 82. In this embodiment, it is possible to replace the data in the narrow-area high-precision map data 82 that does not match the reality with the interpolation data 84, and use the interpolation data 84 to generate the low-order assistance data. In this embodiment, it is possible to generate the low-order assistance data that has been changed to match the reality, without updating the narrow-area high-precision map data 82 itself.

Furthermore, in the case where the narrow-area high-precision map data 82 is updated by the map update server apparatus 8, the interpolation controller 86 of this embodiment compares the generated interpolation data 84 with the updated narrow-area high-precision map data 82. Thus, in this embodiment, in the case where the data corresponding to the interpolation data 84 is included in the updated narrow-area high-precision map data 82, the interpolation data 84 is deleted. In this embodiment, after the narrow-area high-precision map data 82 is updated, it is possible to restore the data in the updated high-precision map data 67 for the use in generating the low-order assistance data.

In this embodiment, in the low-order assistance server apparatus 5, the interpolation controller 86 is configured to record the minute-area map data 83 corresponding to a portion of the narrow-area high-precision map data 82, separately from the narrow-area high-precision map data 82. Moreover, the low-order assistance unit 88 generates the low-order assistance data that assists in the travel control of the automobile 2, with the preferential use of the minute-area map data 83 to the narrow-area high-precision map data 82.

Thus, in the low-order assistance data generated by the low-order assistance unit 88 to assist in the travel control of the automobile 2, it is possible to replace a portion of the narrow-area high-precision map data 82 with the minute-area map data 83.

Furthermore, allowing a portion of the narrow-area high-precision map data 82 to be replaceable with the minute-area map data 83 makes it possible, in this embodiment, to use the high-precision map data regarding the minimum area 74, e.g., a parking lot, that is not included in the high-precision map data 67, to generate the low-order assistance data. In this embodiment, it is possible to freely expand the range in which the low-order assistance server apparatus 5 is able to assist in the travel control, by the minute-area map data 83. Examples of the minute-area map data 83 are assumed to include map data regarding a redevelopment area and map data regarding an underground parking lot of commercial facilities. This makes it easier for companies to register the minute-area map data 83 in this system for active use of the minute-area map data 83 by their visitors by the automobiles 2, as a part of the companies' services.

In addition, in this embodiment, the data to be preferentially used such as the minute-area map data 83 is held and used solely in the low-order assistance server apparatus 5 out of the low-order assistance server apparatus 5 and the high-order assistance server apparatus 7. The low-order assistance server apparatus 5 is adapted for, for example, temporary changes. As a result, the high-order assistance server apparatus 7 does not need to hold and use data corresponding to, for example, the temporary changes. The high-order assistance server apparatus 7 does not need to carry out processing of managing the minute-area map data 83 corresponding to, for example, the temporary changes, and updating the data in accordance with the temporary changes. Moreover, recording the data corresponding to, for example, the temporary changes restrictively in the low-order assistance server apparatus 5 renders it unnecessary to perform communication to transmit the data to the high-order assistance server apparatus 7. It is possible to reduce a communication load on the travel control assistance system 1. Moreover, the data corresponding to, for example, the temporary changes is transmitted and received only by the communication from the automobile 2 to the low-order assistance server apparatus 5.

It is to be noted that the minute-area map data 83 to be held and used in the low-order assistance server apparatus 5 of this embodiment may be high-precision map data of the same format as the narrow-area high-precision map data 82 to be used in the low-order assistance server apparatus 5. In this case, the minute-area map data 83 may include, for example, data regarding, for example, a guideline and boundary lines of a travel route or a travel area where the automobile 2 is able to travel in the minute area, a guideline of an intersection or a junction, a division line for each parking or stopping space, and surrounding objects recognizable from the automobile 2.

However, there is possibility that the minute-area map data provided by companies may have a different format from that of the narrow-area high-precision map data 82. In this case, the interpolation controller 86 may convert the minute-area map data in the different format provided by the companies into data in the same format as the narrow-area high-precision map data 82 used by the low-order assistance server apparatus 5, and record the converted data in the server memory 63 of the low-order assistance server apparatus 5. Alternatively, the server CPU 64 of the low-order assistance server apparatus 5 may carry out the travel assistance control based on the minute-area map data 83 as a separate control from the travel assistance control based on the narrow-area high-precision map data 82.

Here, the minute area is not limited to those exemplified above, but may be an area on a paper map in which the vehicle is able to travel. Alternatively, the minute area may be an area on the paper map that is recognizable by, for example, the automobile 2 as being passable. Furthermore, the minute area is considered to be a minute area necessary for preventing collision (rush out) when a vehicle enters a general road, e.g., a coupling portion (intersection) between a general road and a forest road.

Moreover, for example, to the wide-area high-precision map data 81, data regarding expressways as high-order roads may be allocated. To the narrow-area high-precision map data 82, data regarding national roads and prefectural roads as low-order roads may be allocated. To the minute-area map data 83, data regarding municipal roads, private roads, parking lots, and footpaths of patches and fields as lower-order roads may be allocated. In addition, municipal roads of cities and towns with heavy traffic may be held in the narrow-area high-precision map data 82, while municipal roads of rural areas and suburbs with little traffic may be held in the minute-area map data 83.

In this embodiment, the low-order assistance server apparatus 5 directly communicates the low-order assistance data generated by itself from the server communication unit 61 to the automobile 2. Moreover, the low-order assistance server apparatus 5, as a relay server apparatus of the high-order assistance server apparatus 7, performs the relay transmission of the high-order assistance data received from the high-order assistance server apparatus 7 to the automobile 2. Unlike the low-order assistance server apparatus 5, the high-order assistance server apparatus 7 does not directly communicate with the automobile 2. Furthermore, the relay controller 89 makes the evaluation of the high-order assistance data by the narrow-area high-precision map data 82 and the interpolation data 84 used in the low-order assistance server apparatus 5. Solely in the case where the evaluation is favorable, the relay controller 89 performs the relay transmission of the high-order assistance data as it is to the automobile 2. Meanwhile, in the case where the evaluation is not favorable, the relay controller 89 refrains from the relay transmission of the high-order assistance data to the automobile 2, or adjusts the high-order assistance data and performs the relay transmission of the high-order assistance data to the automobile 2. In this embodiment, it is possible to evaluate the high-order assistance data generated by the high-order assistance server apparatus 7, with the use of, for example, the high-precision map data 67 of the low-order assistance server apparatus 5 as an evaluation criterion of the comparison, and control the relay to the automobile 2.

Although the forgoing embodiments are preferred embodiments of the invention, the invention is by no means limited thereto. It should be appreciated that various modifications and alterations may be made by persons skilled in the art without departing from the scope as defined by the appended claims.

The travel control assistance system 1 of the forgoing embodiments includes the low-order assistance server apparatuses 5 and the high-order assistance server apparatus 7, as the assistance server apparatuses that use the high-precision map data 67. The travel control assistance system 1 may include the multiple high-order assistance server apparatuses 7.

Moreover, in the travel control assistance system 1, the assistance server apparatuses may have a layered structure of three or more layers. In this case, allowing the assistance server apparatus of the lowest layer to have a similar function to that of the low-order assistance server apparatus 5 described above makes it possible to adjust, in accordance with the actual travel environment, the assistance data generated by the assistance server apparatuses of the respective layers to assist in the travel of the automobiles. The assistance server apparatuses of the second layer from the bottom or higher may have a similar configuration to that of the high-order assistance server apparatus 7 described above.

In the forgoing embodiments, solely the low-order assistance server apparatus 5 out of the low-order assistance server apparatus 5 and the high-order assistance server apparatus 7 holds and uses the data to be preferentially used, e.g., the minute-area map data 83.

In addition, for example, the data to be preferentially used, e.g., the minute-area map data 83, may be held and used in the high-order assistance server apparatus 7 as well. This makes it possible for the high-order assistance server apparatus 7 to generate the high-order assistance data corresponding to, for example, the temporary changes and transmit the generated data to the low-order assistance server apparatus 5. The low-order assistance server apparatus 5 is able to transmit such high-order assistance data from the high-order assistance server apparatus 7 as it is to the automobile 2. It is possible to reduce a processing load on the low-order assistance server apparatus 5.

DESCRIPTION OF REFERENCE NUMERALS

1: Travel control assistance system
2: Automobile (vehicle)
3: Base station
4: Carrier communication cable
5: Low-order assistance server apparatus
6: Carrier communication network
7: High-order assistance server apparatus
8: Map update server apparatus

10: Control system
11: Driving controller
12: Steering controller
13: Braking controller
14: Driving operation controller
15: Vehicle sensor unit
16: Travel controller
17: Vehicle communication unit
18: Central gateway apparatus
19: Cable
21: Acceleration rate sensor
22: Corner radar
23: Stereo camera
24: Lidar
25: Omnidirectional camera
26: GNSS receiver
31: Vehicle memory
32: Vehicle ECU
33: Vehicle high-precision map data
60: Server apparatus
61: Server communication unit
62: Server GNSS receiver
63: Server memory
64: Server CPU
65: Server bus
66: Base station communication unit
67: Service-area high-precision map data
68: Other server apparatuses
70: First narrow area
71: Second narrow area
72: Wide area
74: Minute area
81: Wide-area high-precision map data
82: Narrow-area high-precision map data
83: Minute-area map data
84: Interpolation data
85: Unservisablity setting data
86: Interpolation controller
87: Vehicle data recognition unit
88: Low-order assistance unit
89: Relay controller
91 to 94: Utility poles
110: GNSS satellites

The invention claimed is:

1. A vehicle travel control assistance system having a map update function, the vehicle travel control assistance system comprising:

assistance server apparatuses that include respective server storages holding map data, the assistance server apparatuses being configured to generate data that assists in a travel control of a vehicle, based on respective pieces of the map data and transmit the data to the vehicle; and a map update server apparatus that includes a server communication unit configured to be coupled to the assistance server apparatuses, the map update server apparatus being configured to update the respective pieces of the map data held in the assistance server apparatuses, wherein the respective pieces of the map data held in the assistance server apparatuses include narrow-area map data and wide-area map data regarding a wide area including an area for the narrow-area map data, the narrow-area map data being held in a low-order one of the assistance server apparatuses, and the wide-area map data being held in a high-order one of the assistance server apparatuses, and the map update server apparatus is configured to:

acquire update data for map updating;

update the wide-area map data held in the high-order one of the assistance server apparatuses by copying the wide-area map data held in the high-order one of the assistance server apparatuses, updating the copied wide-area map data based on the update data to generate the updated wide-area map data, and switching the updated wide-area map data to active in the high-order one of the assistance server apparatuses; and update the narrow-area map data held in the low-order one of the assistance server apparatuses by copying the narrow-area map data held in the low-order one of the assistance server apparatuses, updating the copied narrow-area map data based on at least a portion of the updated wide-area map data or corresponding data extracted from the updated wide-area map data to generate updated narrow-area map data, and switching the updated narrow-area map data to active in the low-order one of the assistance server apparatuses, the low-order one of the assistance server apparatuses comprises:

a vehicle communication unit configured to communicate with the vehicle and receive actual detection data by a vehicle sensor of the vehicle;

a recognition unit configured to generate recognition data including a travel route of the vehicle and surrounding objects of the vehicle corresponding to actual travel environment of the vehicle, based on the detection data by the vehicle received by the vehicle communication unit by direct communication;

an interpolation controller configured to:

generate interpolation data based on the recognition data of a surrounding object recognized as present in the actual travel environment, the interpolation data complementing a difference between the narrow-area map data and the actual travel environment; and generate and register unserviceability setting data based on a surrounding object included in the narrow-area map data but not recognized as present in the actual travel environment, the unserviceability setting data being data that identifies a portion of the narrow-area map data corresponding to the surrounding object and sets the identified portion as unserviceable; and a low-order assistance unit configured to assist in the travel control of the vehicle, the low-order assistance unit is configured to generate low-order assistance data that assists in the travel control of the vehicle, with preferential use of the interpolation data and the unserviceability setting data relative to the narrow-area map data, the preferential use of the interpolation data causes the low-order assistance unit to include, in the low-order assistance data, data corresponding to the surrounding object recognized as present in the actual travel environment when the narrow-area map data does not include the data corresponding to the surrounding object, and the preferential use of the unserviceable setting data causes the low-order assistance unit to exclude, from use in generating the low-order assistance data, data in the narrow-area map data that corresponds to the surrounding object that is included in the narrow-area map data but not recognized as present in the actual travel environment.

2. The vehicle travel control assistance system having the map update function according to claim 1, wherein the map update server apparatus is configured to update the wide-area map data out of the narrow-area map data and the wide-area map data, and afterwards, update the narrow-area map data with use of the updated wide-area map data or equivalent map data.

3. The vehicle travel control assistance system having the map update function according to claim 1, wherein the low-order assistance unit is configured to, on a condition that corresponding data to the interpolation data or corresponding data to the unserviceability setting data is included in the narrow-area map data generate the low-order assistance data that assists in the travel control of the vehicle, with use of the interpolation data or the unserviceability setting data instead of the corresponding data in the narrow-area map data.

4. The vehicle travel control assistance system having the map update function according to claim 1, wherein the low-order one of the assistance server apparatuses is configured to communicate, from the vehicle communication unit to the vehicle, the low-order assistance data generated by the low-order assistance unit in the low-order assistance server apparatus to assist in the travel control of the vehicle, the high-order one of the assistance server apparatuses is configured to generate high-order assistance data different from the low-order one of the assistance server apparatuses or high-order assistance data regarding a longer distance than the low-order assistance data, to assist in the travel control of the vehicle, and transmits the high-order assistance data to the low-order one of the assistance server apparatuses, the low-order one of the assistance server apparatuses comprises a relay controller configured to control relay transmission to the vehicle with respect to the high-order assistance data received from the high-order one of the assistance server apparatuses, and the relay controller is configured to make an evaluation of the high-order assistance data by the narrow-area map data and at least one of the interpolation data and the unserviceability setting data to be used in the low-order one of the assistance server apparatuses, and perform relay transmission of the high-order assistance data as it is to the vehicle on a condition that the evaluation is favorable.

5. The vehicle travel control assistance system having the map update function according to claim 1, wherein the interpolation controller is configured to:

compare the generated at least one of interpolation data and unserviceability setting data with the updated narrow-area map data on a condition that the narrow-area map data is updated by the map update server apparatus; and delete the at least one of interpolation data and unserviceability setting data on a condition that corresponding data to the at least one of interpolation data and unserviceability setting data is included in the updated narrow-area map data.

6. The vehicle travel control assistance system having the map update function according to claim 1, wherein, solely in the low-order one of the assistance server apparatuses out of the low-order one of the assistance server apparatuses and the high-order one of the assistance server apparatuses, the interpolation controller is configured to record minute-area map data corresponding to a portion of the narrow-area map data, and the low-order assistance unit is configured to generate the low-order assistance data that assists in the travel control of the vehicle, with preferential use of at least one of the minute-area map data, the interpolation data, and the unserviceability setting data to the narrow-area map data.

7. The vehicle travel control assistance system having the map update function according to claim 3, wherein the low-order one of the assistance server apparatuses is configured to communicate, from the vehicle communication unit to the vehicle, the low-order assistance data generated by the low-order assistance unit in the low-order assistance server apparatus to assist in the travel control of the vehicle, the high-order one of the assistance server apparatuses is configured to generate high-order assistance data different from the low-order one of the assistance server apparatuses or high-order assistance data regarding a longer distance than the low-order assistance data, to assist in the travel control of the vehicle, and transmits the high-order assistance data to the low-order one of the assistance server apparatuses, the low-order one of the assistance server apparatuses comprises a relay controller configured to control relay transmission to the vehicle with respect to the high-order assistance data received from the high-order one of the assistance server apparatuses, and the relay controller is configured to make an evaluation of the high-order assistance data by the narrow-area map data and at least one of the interpolation data and the unserviceability setting data to be used in the low-order one of the assistance server apparatuses, and perform relay transmission of the high-order assistance data as it is to the vehicle on a condition that the evaluation is favorable.

8. The vehicle travel control assistance system having the map update function according to claim 3, wherein the interpolation controller is configured to:

compare the generated at least one of interpolation data and unserviceability setting data with the updated narrow-area map data on a condition that the narrow-area map data is updated by the map update server apparatus; and delete the at least one of interpolation data and unserviceability setting data on a condition that corresponding data to the at least one of interpolation data and unserviceability setting data is included in the updated narrow-area map data.

9. The vehicle travel control assistance system having the map update function according to claim 3, wherein, solely in the low-order one of the assistance server apparatuses out of the low-order one of the assistance server apparatuses and the high-order one of the assistance server apparatuses, the interpolation controller is configured to record minute-area map data corresponding to a portion of the narrow-area map data, and the low-order assistance unit is configured to generate the low-order assistance data that assists in the travel control of the vehicle, with preferential use of at least one of the minute-area map data, the interpolation data, and the unserviceability setting data to the narrow-area map data.

10. An assistance server apparatus that generates assistance data configured to assist in a travel control of a vehicle and transmit the assistance data to the vehicle, in a vehicle travel control assistance system configured to assist in the travel control of the vehicle, the assistance server apparatus comprising:

a server storage that holds map data, to allow the map data to be updatable by a map update server apparatus provided in the vehicle travel control assistance system; and a controller configured to generate the assistance data that assists in the travel control of the vehicle, with use of the map data held in the server storage, wherein the server storage holds, together with the map data that is updatable by the map update server apparatus, interpolation data that is generated based on recognition data of a surrounding object recognized as present in an actual travel environment, the interpolation data complementing a difference between the map data and the actual travel environment, unserviceability setting data that renders unserviceable a portion of the map data, the unserviceability setting data being generated based on the surrounding object included in the map data but not recognized as present in the actual travel environment, the unserviceability setting data being data that identifies a portion of the map data corresponding to the surrounding object and sets the identified portion as unserviceable, and minute-area map data regarding a minute area as a portion of an area for the map data, the minute-area map data corresponding to a portion of the map data and being used, instead of the map data, to assist in the travel control of the vehicle when the vehicle is in the minute area, the controller is configured to generate the assistance data that assists in the travel control of the vehicle, with preferential use of the interpolation data, the unserviceability setting data, and the minute-area map data held in the server storage, to the updatable map data, the updatable map data including the map data, the preferential use of the interpolation data causes the controller to include, in the assistance data, data corresponding to the surrounding object recognized as present in the actual travel environment when the map data does not include the data corresponding to the surrounding object, the preferential use of the unserviceable setting data causes the controller to exclude, from use in generating the assistance data, data in the map data that corresponds to the surrounding object that is included in the map data but not recognized as present in the actual travel environment, and the preferential use of the minute-area map data causes the controller to use, instead of the map data, the minute-area map data for a minute area as a portion of an area for the map data, when a vehicle position is in the minute area.

* * * * *